United States Patent
Matono

(10) Patent No.: US 6,665,144 B2
(45) Date of Patent: Dec. 16, 2003

(54) THIN FILM MAGNETIC HEAD AND METHOD OF MAKING WHEREIN THE HEAD INCLUDES A MAGNETIC LAYER INCLUDING AN UNDERLAYER AND A COATING LAYER WITH EACH HAVING A UNIFORM WIDTH PORTION AND A WIDER PORTION

(75) Inventor: Naoto Matono, Saku (JP)

(73) Assignee: Sae Magnetics (H.K.) Ltd., Kwai Ghung (CN)

( * ) Notice: Subject to any disclaimer, the term of this patent is extended or adjusted under 35 U.S.C. 154(b) by 65 days.

(21) Appl. No.: 10/075,182

(22) Filed: Feb. 13, 2002

(65) Prior Publication Data

US 2002/0135936 A1 Sep. 26, 2002

(30) Foreign Application Priority Data

Feb. 13, 2001 (JP) ........................................ 2001-035619

(51) Int. Cl.[7] .............................. G11B 5/187; G11B 5/31
(52) U.S. Cl. ..................................................... 360/126
(58) Field of Search ................................ 360/317, 122, 360/126

(56) References Cited

U.S. PATENT DOCUMENTS

| | | | | |
|---|---|---|---|---|
| 6,373,657 B1 | * | 4/2002 | Kamijima | 360/126 |
| 6,381,093 B2 | * | 4/2002 | Yoshida et al. | 360/126 |
| 6,436,560 B1 | * | 8/2002 | Kato et al. | 428/692 |
| 6,459,543 B1 | * | 10/2002 | Sasaki | 360/126 |
| 6,469,876 B1 | * | 10/2002 | Sasaki et al. | 360/317 |
| 6,510,024 B2 | * | 1/2003 | Otsuka et al. | 360/126 |

* cited by examiner

*Primary Examiner*—Jefferson Evans
(74) *Attorney, Agent, or Firm*—Kenyon & Kenyon

(57) ABSTRACT

Provided are a thin film magnetic head and a method of manufacturing the same, which can quite reduce a pole width with high accuracy while improving overwrite characteristics. A top pole comprises a laminate constituted of an underlayer and a coating layer, which are laminated in order from the side of a write gap layer. A second coupling position of the underlayer (a position where an underlayer front-end portion is coupled to an underlayer rear-end portion) is located closer to an air bearing surface than a first coupling position of the coating layer (a position where an tip portion is coupled to a yoke portion). A first uniform-width distance and a second uniform-width distance can be set independently, thereby enabling reducing the second uniform-width distance within such a range that the accuracy in forming the tip portion can be ensured, while increasing the first uniform-width distance within such a range that the overwrite characteristics can be ensured.

21 Claims, 17 Drawing Sheets

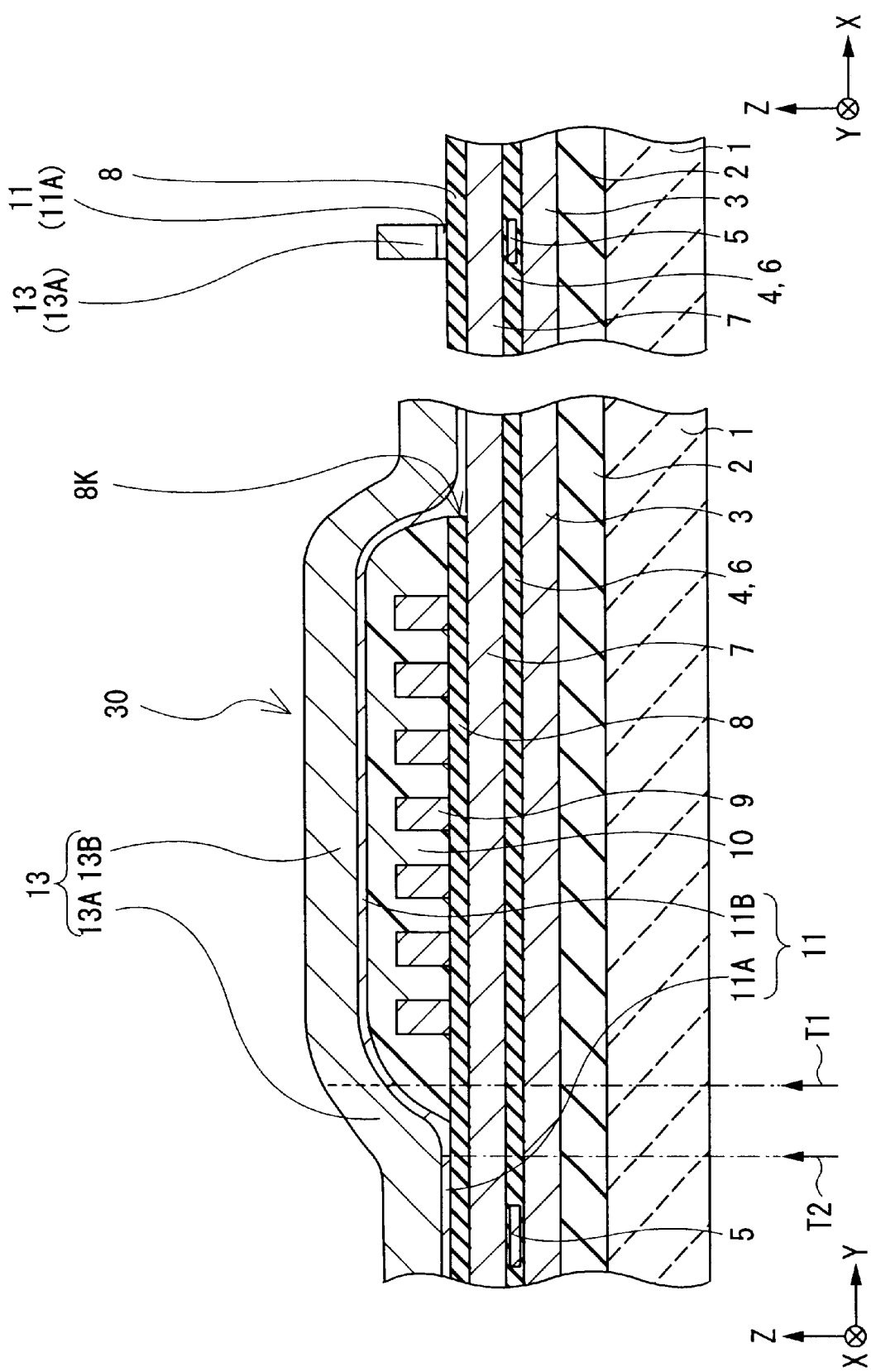

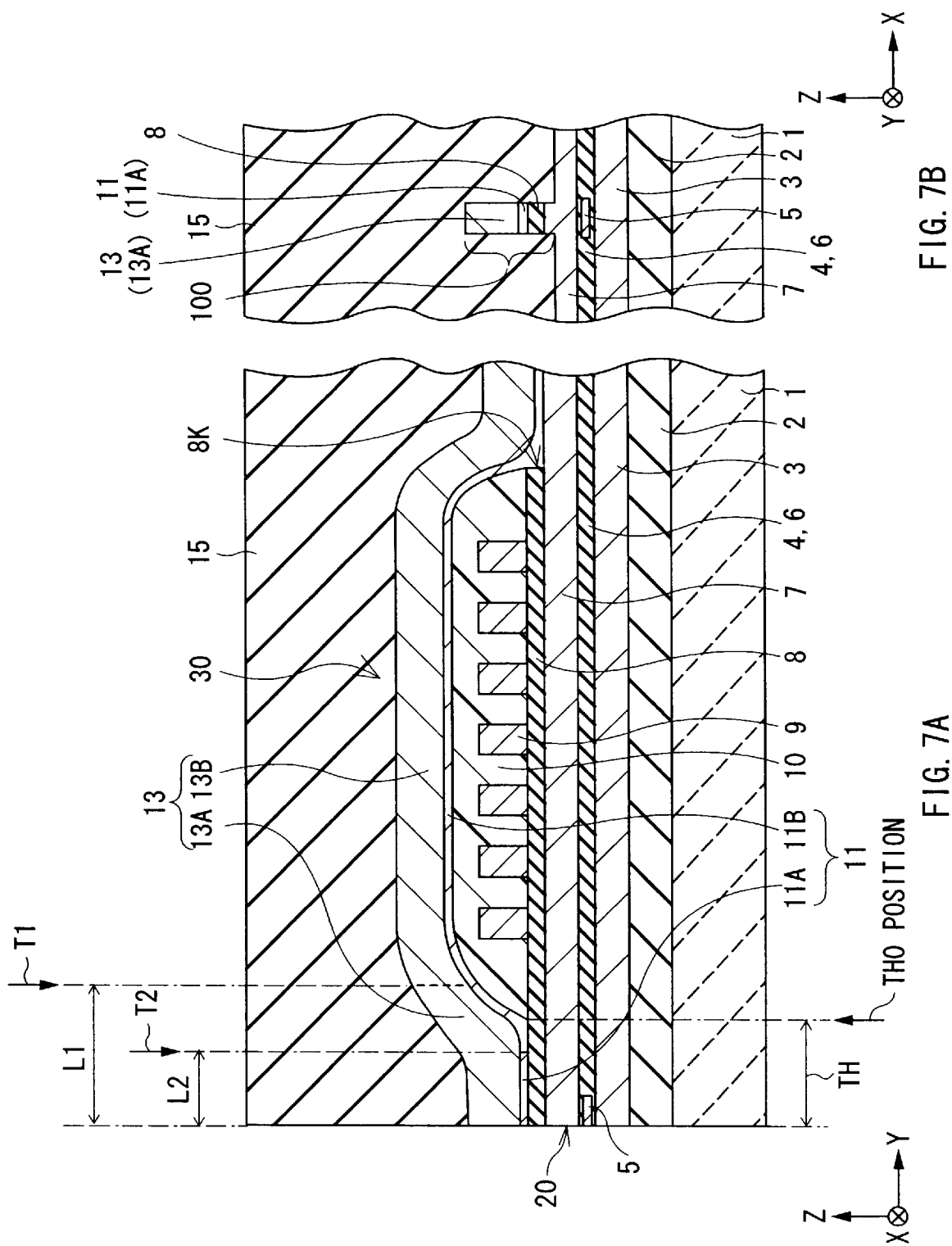

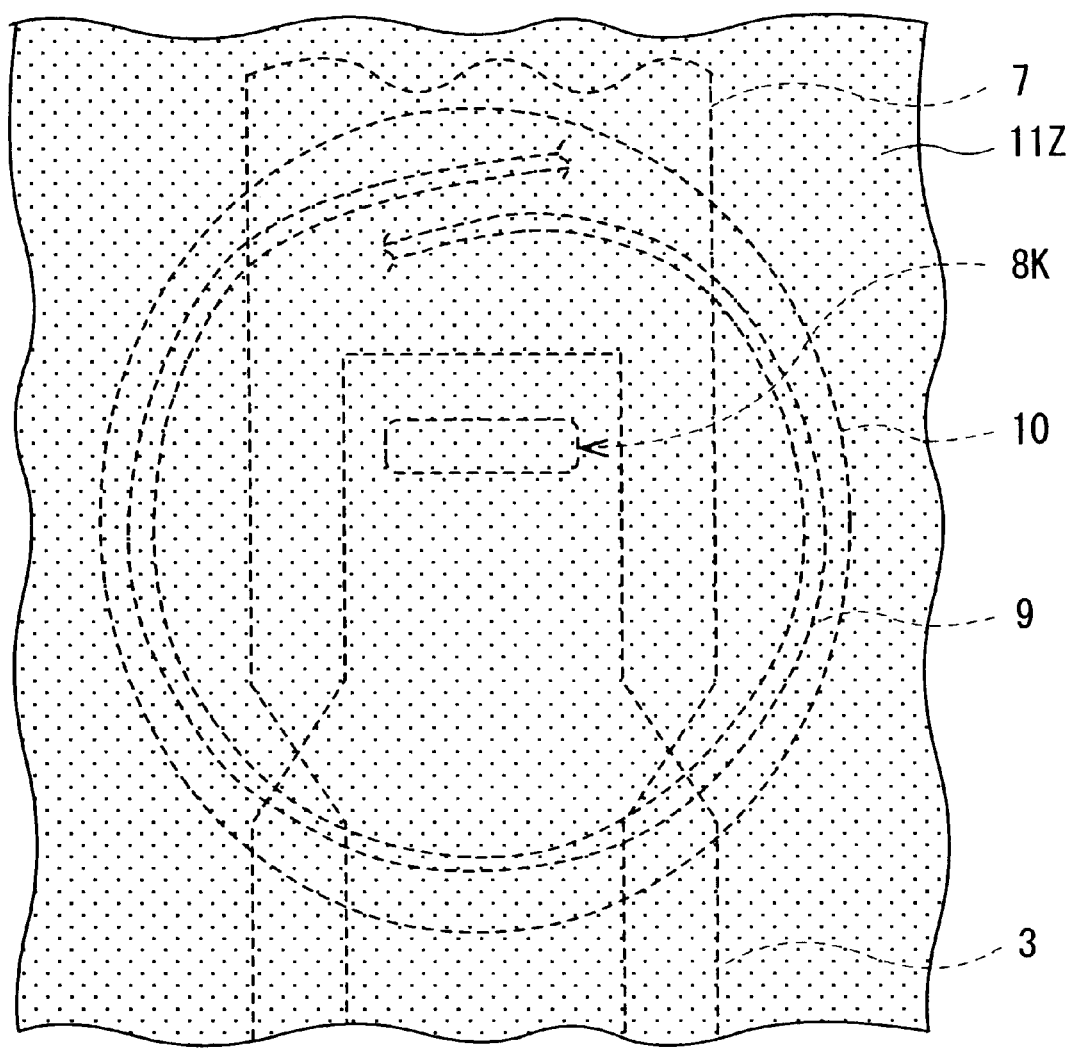
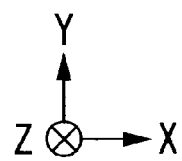
FIG. 8

THIN FILM MAGNETIC HEAD AND METHOD OF MAKING WHEREIN THE HEAD INCLUDES A MAGNETIC LAYER INCLUDING AN UNDERLAYER AND A COATING LAYER WITH EACH HAVING A UNIFORM WIDTH PORTION AND A WIDER PORTION

BACKGROUND OF THE INVENTION

1. Field of the Invention

The invention relates to a thin film magnetic head having an inductive magnetic transducer for writing and a method of manufacturing the same.

2. Description of the Related Art

Recently, an improvement in performance of a thin film magnetic head has been sought in accordance with an increase in a surface recording density of a hard disk drive. For example, a composite thin film magnetic head, which has a laminated structure comprising a recording head having an inductive magnetic transducer for writing and a reproducing head having a magnetoresistive (hereinafter referred to as MR) element for reading, is widely used as the thin film magnetic head.

For example, the recording head includes a top pole and a bottom pole provided respectively on and under a write gap, a coil for generating a magnetic flux provided between the top pole and the bottom pole, and an insulating layer for insulating the coil from the top pole and the bottom pole. The top pole and the bottom pole have the same uniform width near the write gap near and in a recording-medium-facing surface (an air bearing surface) to be faced with a magnetic recording medium (hereinafter referred to as "a recording medium"), and these portions constitute "a magnetic pole portion (pole portion)" for determining a write track width. The pole portion is formed in a certain manner. For example, the top pole having a uniform-width portion constituting a part of the pole portion is formed, and thereafter the write gap and the bottom pole are etched in self-alignment by using the uniform-width portion as a mask.

In the recording head, a current passes through a coil from an external circuit at the time of an information recording operation, and thus a magnetic flux is generated in response to the current. Mainly, the generated magnetic flux flows into the top pole, propagates to a portion having a uniform width constituting a part of the pole portion (hereinafter referred to as "a uniform-width portion"), and reaches to a tip portion of the uniform-width portion close to the air bearing surface. A signal magnetic field for recording is generated outside near the write gap by the magnetic flux that reaches to the tip portion, and thus the magnetic recording medium is partly magnetized by the signal magnetic field, so that information is recorded on the magnetic recording medium.

To improve recording characteristics of the performance of the recording head, e.g., characteristics of overwriting information (overwrite characteristics), it is required that a sufficient level of magnetic flux is supplied to the uniform-width portion of the top pole in order to sufficiently generate a signal magnetic field. To increase a recording density, it is required that a width of the pole portion (a pole width) is quite reduced to the submicron order so as to increase a track density on the recording medium. In this case, preferably, the pole width is uniform with high accuracy over the entire area of the pole portion. It is because a side erase phenomenon occurs, when the pole width is partly great, that is, information is written on an adjacent track region as well as a track region on which the information is to be written, so that information written previously on the adjacent track region is overwritten with the newly written information, which is thus erased.

However, for example, when a shape of the top pole is designed so as to necessarily and sufficiently supply magnetic flux to the uniform-width portion for the purpose of improving the overwrite characteristics, the overwrite characteristics improve, whereas the accuracy in forming the uniform-width portion deteriorates and therefore it becomes difficult to reduce the pole width to the submicron order (e.g., 0.5 $\mu$m or less). In other words, there has been heretofore a problem that it is difficult to achieve both the improvement of the overwrite characteristics and the reduction of the pole width with high accuracy.

SUMMARY OF THE INVENTION

The invention is designed to overcome the foregoing problem. It is an object of the invention to provide a thin film magnetic head and a method of manufacturing the same, which can quite reduce a pole width with high accuracy while improving overwrite characteristics.

According to the invention, there is provided a thin film magnetic head comprising: two magnetic layers magnetically coupled to each other and having two magnetic poles which face each other with a gap layer in between and are arranged to be faced with a recording medium, a thin film coil provided between the two magnetic layers, and an insulating layer for insulating the thin film coil from the two magnetic layers, wherein one of the two magnetic layers includes a laminate constituted of an underlayer and a coating layer, the underlayer being located closer to the gap layer, the coating layer being located away from the gap layer, the coating layer includes a first uniform-width portion and a first wider portion, the first uniform-width portion extending from a recording-medium-facing surface facing the recording medium to a first coupling position away from the recording-medium-facing surface and having a uniform width for determining a write track width on the recording medium, the first wider portion being magnetically coupled to the first uniform-width portion at the first coupling position and having a width greater than that of the uniform width of the first uniform-width portion, and the underlayer includes a second uniform-width portion and a second wider portion, the second uniform-width portion extending from the recording-medium-facing surface to a second coupling position which locates closer to the recording-medium-facing surface than the first coupling position and having a uniform width corresponding to the uniform width of the first uniform-width portion, the second wider portion being magnetically coupled to the second uniform-width portion at the second coupling position and having a width greater than that of the uniform width of the second uniform-width portion.

According to a first aspect of the invention, there is provided a method of manufacturing a thin film magnetic head including: two magnetic layers magnetically coupled to each other and having two magnetic poles which face each other with a gap layer in between and are arranged to be faced with a recording medium, a thin film coil provided between the two magnetic layers, and an insulating layer for insulating the thin film coil from the two magnetic layers, wherein steps of forming one of the two magnetic layers includes: a first step of forming a precursory underlayer so as to coat the insulating layer and a peripheral region around the insulating layer; a second step of forming on the precursory underlayer a coating layer as a part of the one of the two magnetic layers, so that the coating layer includes a first uniform-width portion and a first wider portion, the first uniform-width portion extending from a recording-medium-facing surface facing the recording medium to a first coupling position away from the recording-medium-facing surface and having a uniform width for determining a write track width on the recording medium, the first wider portion being magnetically coupled to the first uniform-width portion at the first coupling position and having a width greater than that of the uniform width of the first uniform-width portion; a third step of selectively forming a patterning mask so as to coat the coating layer and part of the precursory underlayer; and a fourth step of selectively etching the precursory underlayer through the use of the patterning mask, thereby selectively forming an underlayer as another part of the one of the two magnetic layers, so that the underlayer includes a second uniform-width portion and a second wider portion, the second uniform-width portion extending from the recording-medium-facing surface to a second coupling position which locates closer to the recording-medium-facing surface than the first coupling position and having a uniform width corresponding to the uniform width of the first uniform-width portion, the second wider portion being magnetically coupled to the second uniform-width portion at the second coupling position and having a width greater than that of the uniform width of the second uniform-width portion.

According to a second aspect of the invention, there is provided a method of manufacturing a thin film magnetic head including: two magnetic layers magnetically coupled to each other and having two magnetic poles which face each other with a gap layer in between and are arranged to be faced with a recording medium, a thin film coil provided between the two magnetic layers, and an insulating layer for insulating the thin film coil from the two magnetic layers, one of the two magnetic layers including a laminate constituted of an underlayer and a coating layer, the underlayer being located closer to the gap layer, the coating layer being located away from the gap layer, wherein the coating layer is formed so as to include a first uniform-width portion and a first wider portion, the first uniform-width portion extending from a recording-medium-facing surface facing the recording medium to a first coupling position away from the recording-medium-facing surface and having a uniform width for determining a write track width on the recording medium, the first wider portion being magnetically coupled to the first uniform-width portion at the first coupling position and having a width greater than that of the uniform width of the first uniform-width portion, and the underlayer is formed so as to include a second uniform-width portion and a second wider portion, the second uniform-width portion extending from the recording-medium-facing surface to a second coupling position which locates closer to the recording-medium-facing surface than the first coupling position and having a uniform width corresponding to the uniform width of the first uniform-width portion, the second wider portion being magnetically coupled to the second uniform-width portion at the second coupling position and having a width greater than that of the uniform width of the second uniform-width portion.

In the thin film magnetic head of the invention or the method of manufacturing a thin film magnetic head of the second aspect of the invention, one of the two magnetic layers includes the laminate constituted of the underlayer and the coating layer, which are laminated in order from the side of the gap layer. The coating layer includes the first uniform-width portion and the first wider portion magnetically coupled to the first uniform-width portion at the first coupling position, which are provided in order from the side of the recording-medium-facing surface. The underlayer includes the second uniform-width portion and the second wider portion magnetically coupled to the second uniform-width portion at the second coupling position closer to the recording-medium-facing surface than the first coupling position, which correspond to the first uniform-width portion and the first wide portion, respectively. Therefore, a distance between the second coupling position and the recording-medium-facing surface is shorter than a distance between the first coupling position and the recording-medium-facing surface.

In the method of manufacturing a thin film magnetic head of the first aspect of the invention, first of all, in the first step, the precursory underlayer is formed so as to coat the insulating layer and the peripheral region around the insulating layer. Then, in the second step, on the precursory underlayer, the coating layer as a part of the one of the two magnetic layers is formed, so that the coating layer includes a first uniform-width portion and a first wider portion, the first uniform-width portion extending from a recording-medium-facing surface facing the recording medium to a first coupling position away from the recording-medium-facing surface and having a uniform width for determining a write track width on the recording medium, the first wider portion being magnetically coupled to the first uniform-width portion at the first coupling position and having a width greater than that of the uniform width of the first uniform-width portion. Then, in the third step, the patterning mask is selectively formed so as to coat the coating layer and part of the precursory underlayer. Then, in the fourth step, the precursory underlayer is selectively etched through the use of the patterning mask, thereby selectively forming the underlayer as another part of the one of the two magnetic layers, so that the underlayer includes the second uniform-width portion and the second wider portion, the second uniform-width portion extending from the recording-medium-facing surface to the second coupling position which locates closer to the recording-medium-facing surface than the first coupling position and having a uniform width corresponding to the uniform width of the first uniform-width portion, the second wider portion being magnetically coupled to the second uniform-width portion at the second coupling position and having a width greater than that of the uniform width of the second uniform-width portion. Thus, one of the two magnetic layers is formed.

In the thin film magnetic head of the invention or the method of manufacturing a thin film magnetic head of the first aspect of the invention, preferably, a material having a higher saturation magnetic flux density than a saturation magnetic flux density of a material of the coating layer is used as a material of the underlayer. In this case, preferably, a material containing nickel iron, iron nitride or cobalt iron is used as the material of the underlayer, and a material containing nickel iron, nickel cobalt iron or cobalt iron is used as the material of the coating layer.

In the thin film magnetic head of the invention, the coating layer may be formed of a plated film, and the underlayer may be used as an electrode for forming the coating layer by plating.

In the method of manufacturing a thin film magnetic head of the first aspect of the invention, the precursory underlayer may be formed by sputtering, and the coating layer may be formed by plating using the precursory underlayer as an electrode.

In the thin film magnetic head of the invention or the method of manufacturing a thin film magnetic head of the first aspect of the invention, the coating layer may be formed so as to have a thickness between 0.3 µm and 6 µm inclusive, and the underlayer may be formed so as to have a thickness between 0.05 µm and 0.3 µm inclusive.

Other and further objects, features and advantages of the invention will appear more fully from the following description.

BRIEF DESCRIPTION OF THE DRAWINGS

FIGS. 4A and 4B are cross sectional views for describing a step following the step of FIGS. 3A and 3B;

FIGS. 7A and 7B are cross sectional views for describing a step following the step of FIGS. 6A and 6B;

FIG. 8 is a plan view corresponding to the cross sectional views shown in FIGS. 1A and 1B;

DETAILED DESCRIPTION OF THE PREFERRED EMBODIMENTS

An embodiment of the invention will be described in detail below with reference to the drawings.

Figure 9:
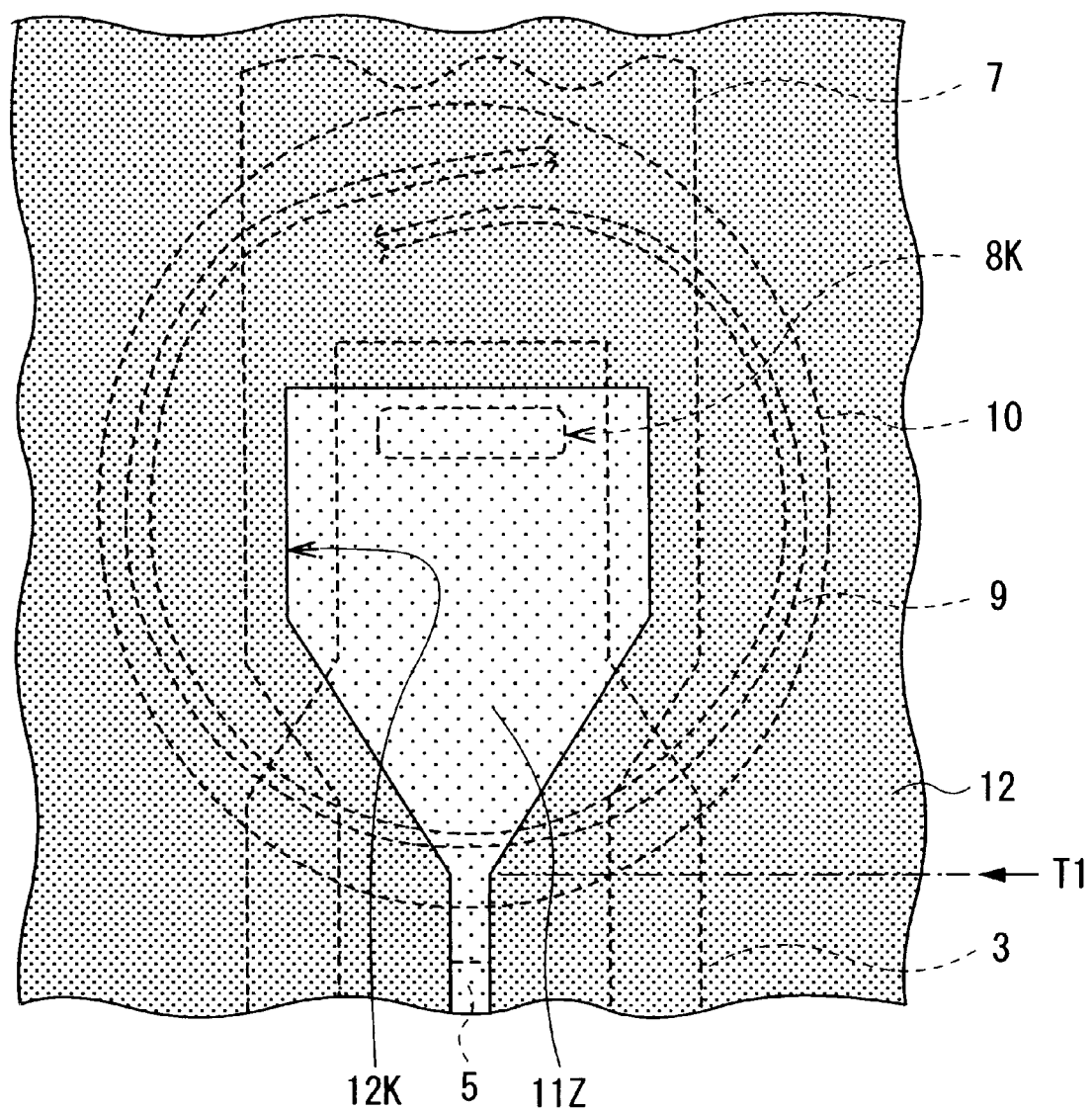
FIG. 9 is a plan view for describing a step following the step of FIGS. 1A and 1B.
Figure 12:
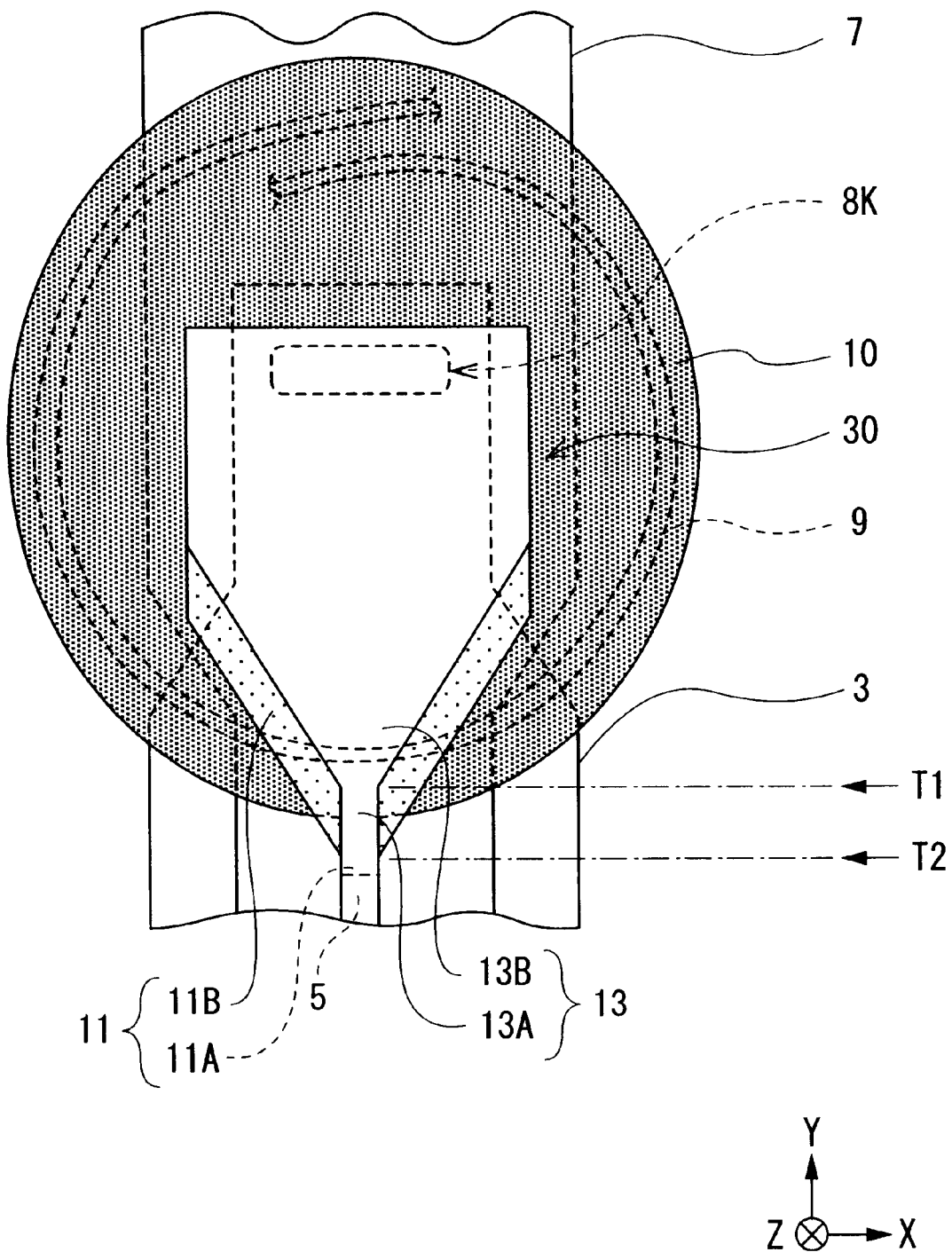
FIG. 12 is a plan view corresponding to the cross sectional views shown in FIGS. 4A and 4B.
Figure 13:
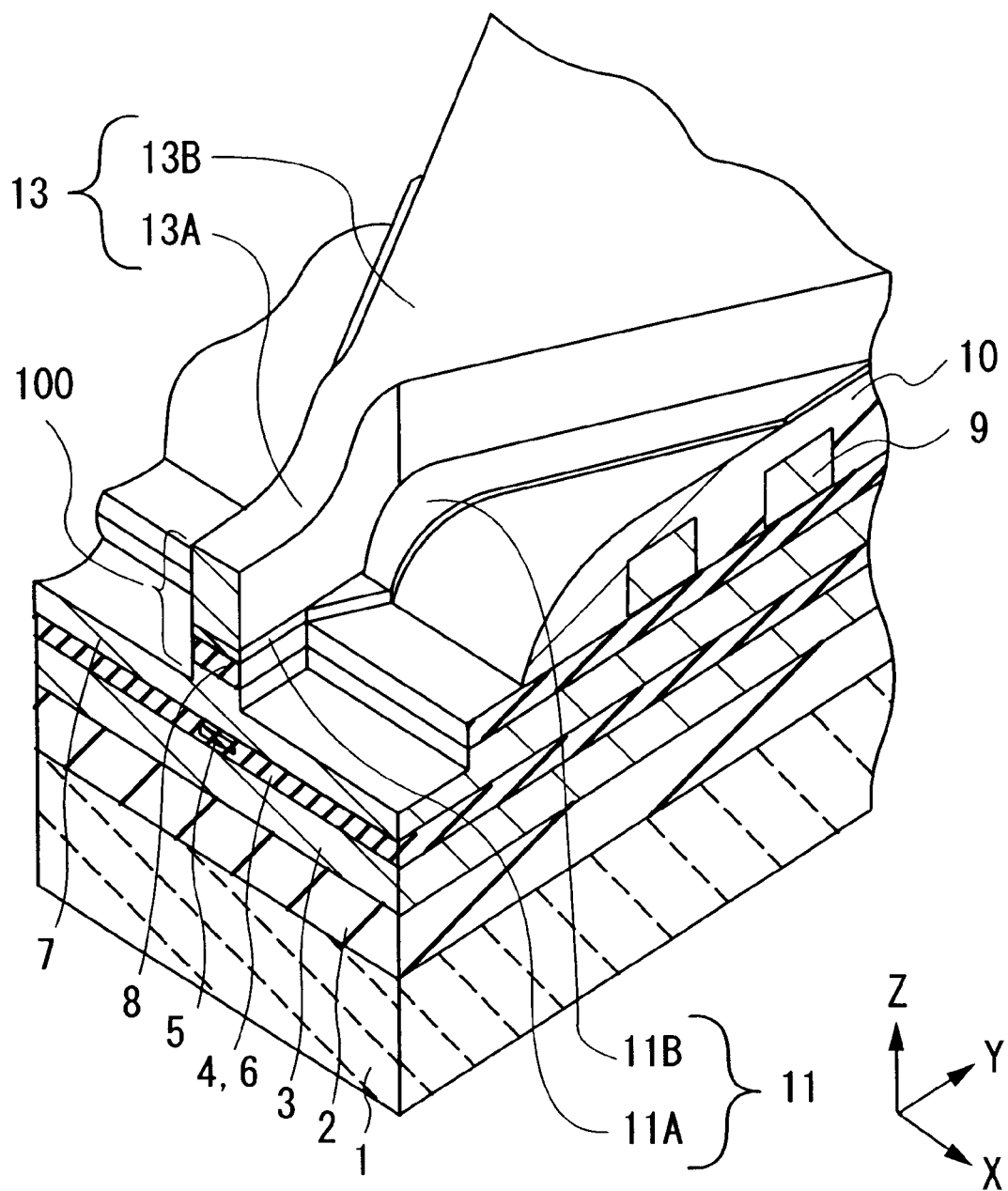
FIG. 13 is a perspective view corresponding to the cross sectional views shown in FIGS. 5A and 5B.

Firstly, the description is given with reference to FIGS. 1A to 13 with regard to a method of manufacturing a composite thin film magnetic head as a method of manufacturing a thin film magnetic head according to the embodiment of the invention. Since a thin film magnetic head of the invention is embodied by the method of manufacturing a thin film magnetic head according to the embodiment, the thin film magnetic head will be described below in conjunction with the method of manufacturing a thin film magnetic head. FIGS. 1A to 7B show the method of manufacturing a thin film magnetic head according to the embodiment of the invention. FIGS. 1A, 2A, 3A, 4A, 5A, 6A and 7A show a cross section perpendicular to an air bearing surface, and FIGS. 1B, 2B, 3B, 4B, 5B, 6B and 7B show a cross section of a pole portion parallel to the air bearing surface. FIGS. 8 to 12 show planar structures. FIGS. 8, 10, 11 and 12 correspond to FIGS. 1A and 1B, 2A and 2B, 3A and 3B, and 4A and 4B, respectively. FIG. 9 is a plan view for describing a step following the step of FIGS. 1A and 1B. FIG. 13 shows a perspective structure corresponding to the sectional structure shown in FIGS. 5A and 5B. FIGS. 8 to 13 show only principal elements of structural elements shown in FIGS. 1A to 5B.

Figure 14:
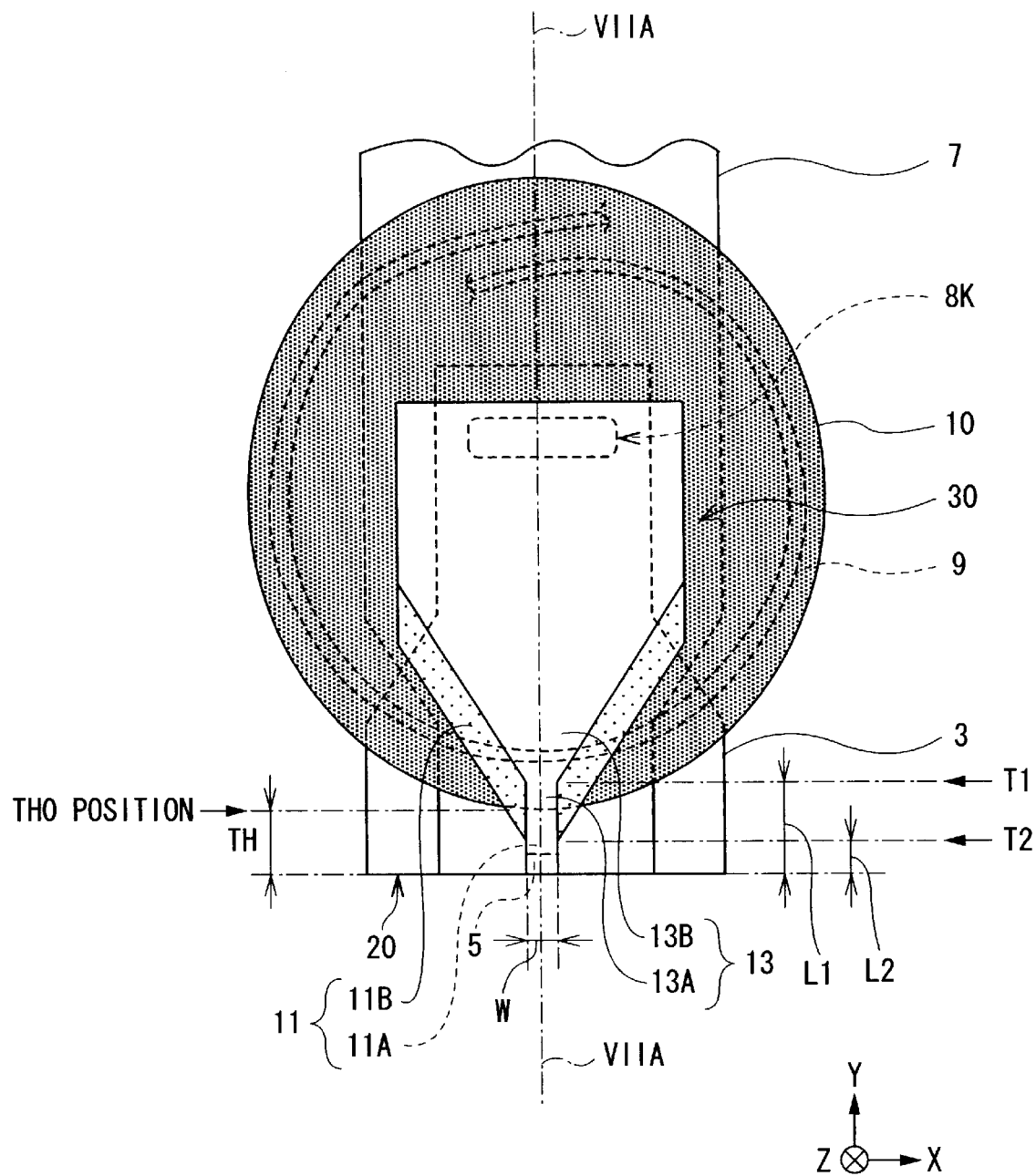
FIG. 14 is a plan view of a planar structure of a thin film magnetic head according to the embodiment of the invention.

In the following description, an X-axis direction, a Y-axis direction and a Z-axis direction in FIGS. 1A to 13 are expressed as "a width", "a length" and "a thickness (or a height)", respectively. The side close to an air bearing surface 20 (see FIGS. 7A and 7B and FIG. 14 to be described later) in the Y-axis direction (or the side to be formed into the air bearing surface 20 in the following step) is expressed as "a front side (or a frontward side)", and the opposite side is expressed as "a rear side (or a rearward side)". In the description of FIG. 14 and the following drawings, the same expressions are given with regard to the X-axis, Y-axis and Z-axis directions.

Method of Manufacturing a Thin Film Magnetic Head

Figures 1A, 1B:
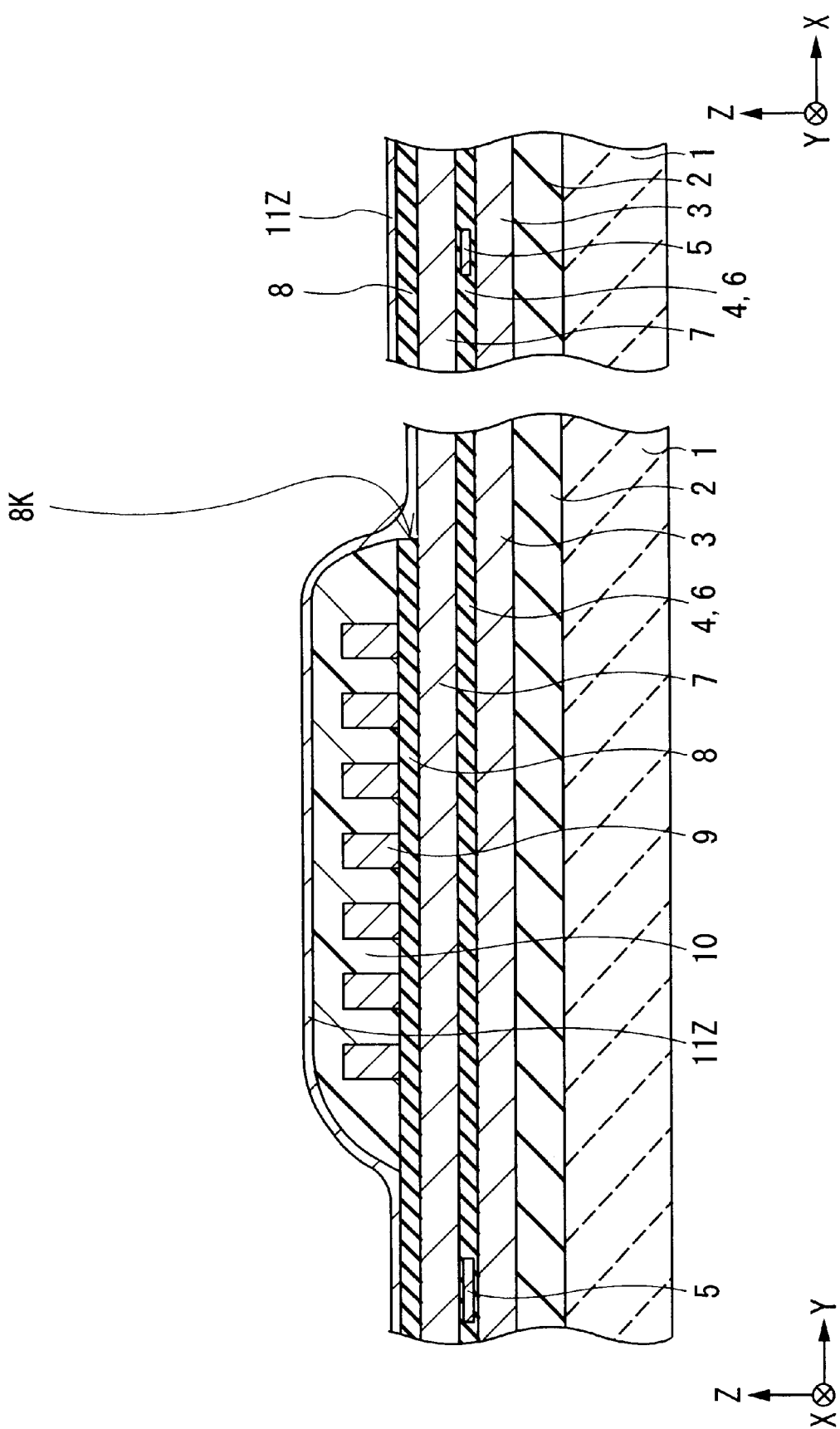
FIGS. 1A and 1B are cross sectional views for describing a step of a method of manufacturing a thin film magnetic head according to an embodiment of the invention.

In the method of manufacturing a thin film magnetic head of the embodiment, first of all, as shown in FIGS. 1A and 1B, an insulating layer 2 made of, for example, aluminum oxide ($Al_2O_3$, hereinafter referred to as "alumina") is deposited with a thickness of about 3.0 µm to 5.0 µm on a substrate 1 made of, for example, attic ($Al_2O_3$—TiC). Then, a bottom shield layer 3 made of, for example, a nickel-iron alloy (NiFe, hereinafter referred to as "Permalloy (a trade name)") is selectively formed with a thickness of about 2.0 µm on the insulating layer 2 by using, for example, plating to be described later. The bottom shield layer 3 is formed so as to have a planar shape shown in FIG. 14 to be described later, for example.

Next, as shown in FIGS. 1A and 1B, a shield gap film 4 made of, for example, alumina is formed with a thickness of about 0.01 µm to 0.1 µm on the bottom shield layer 3 by sputtering, for example. Then, an MR film 5 for constituting an MR element is formed into a desired pattern shape on the shield gap film 4 by using high-accuracy photolithography. Then, a shield gap film 6 is formed so as to coat the MR film 5 by using the same material and forming method as in the case of forming the shield gap film 4, and thus the MR film 5 is buried in the shield gap films 4 and 6.

Next, as shown in FIGS. 1A and 1B, a bottom pole 7 is selectively formed with a thickness of about 2.0 µm to 3.0 µm on the shield gap film 6 by using the same forming method and material as in the case of forming the bottom shield layer 3, for example. The bottom pole 7 is formed so as to have a planar shape shown in FIG. 14 to be described later, for example.

Next, as shown in FIGS. 1A and 1B, a write gap layer 8 made of, for example, alumina is formed with a thickness of about 0.1 µm to 0.3 µm by sputtering, for example. At this time, an opening 8K for connecting the bottom pole 7 to a top pole 30 (see FIGS. 4A and 4B) and so on to be formed in the following step is formed in the write gap layer 8. The write gap layer 8 corresponds to a specific example of "a gap layer" of the invention.

Next, as shown in FIGS. 1A and 1B, a thin film coil 9 made of, for example, copper (Cu) for an inductive recording head is selectively formed with a thickness of about 1.5 μm on the write gap layer 8 by electroplating, for example. The thin film coil 9 is formed so as to have a spiral winding structure shown in FIG. 14 to be described later, for example. In FIG. 14, the thin film coil 9 is, only partly shown.

Next, the thin film coil 9 and a peripheral region around the thin film coil 9 are coated with a material having fluidity during heating, e.g., an organic insulating material such as a photoresist, and thus a photoresist film is selectively formed. Then, the photoresist film is subjected to heat treatment at a temperature between about 200 and 250 degrees. By this heat treatment, the photoresist flows and thus fills up a gap between windings of the thin film coil 9 with no space, so that an insulating layer 10 for electrically insulating the thin film coil 9 from surroundings thereof is selectively formed, as shown in FIGS. 1A and 1B. A surface of the insulating layer 10 near each of the edges thereof changes to a rounded slope due to the flow of the photoresist. The insulating layer 10 is formed in such a manner that the opening 8K formed in the write gap layer 8 in the preceding step is not coated with the insulating layer 10. The insulating layer 10 corresponds to a specific example of "an insulating layer" of the invention.

Next, as shown in FIGS. 1A and 1B and FIG. 8, a precursory underlayer 11Z (a sparse halftone-dot-meshed area in FIG. 8) made of a material having a higher saturation magnetic flux density than a saturation magnetic flux density of, for example, a material of a coating layer 13 to be described later (see FIGS. 2A and 2B), specifically, Permalloy (Ni: 55 wt %, Fe: 45 wt %), iron nitride (FeN), a cobalt-iron alloy (CoFe) or the like is formed with a thickness of about 0.05 μm to 0.3 μm over the entire surface of the laminated structure formed in the proceeding process by sputtering, for example. The precursory underlayer 11Z mainly functions as a seed layer for performing plating for forming the coating layer 13 to be described later, and is a preparatory layer to be patterned into an underlayer 11 to be described later (see FIGS. 4A and 4B and FIG. 12) in a step to be described later.

Next, the overall surface of the laminated structure formed in the proceeding process is coated with a photoresist so that a photoresist film is formed, and thereafter the photoresist film is patterned by using high-accuracy photolithography, whereby a photoresist pattern 12 (a dense halftone-dot-meshed area in FIG. 9) as a frame for forming the coating layer 13 to be described later (see FIGS. 2A and 2B) is formed as shown in FIG. 9. The photoresist pattern 12 is formed so as to have an opening 12K corresponding to a planar shape of the coating layer 13.

Figures 2A, 2B:
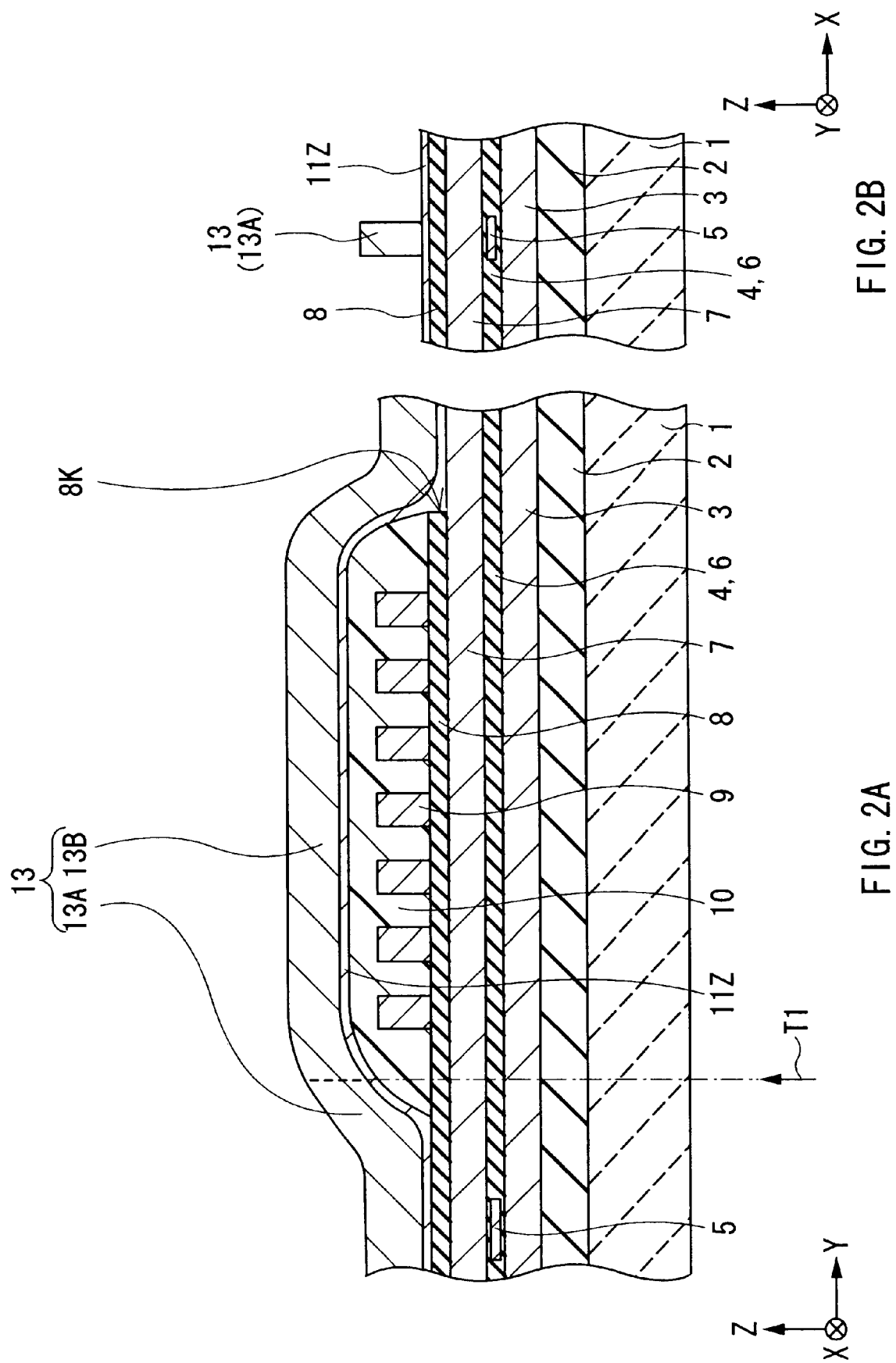
FIGS. 2A and 2B are cross sectional views for describing a step following a step of FIGS. 1A and 1B.
Figure 10:
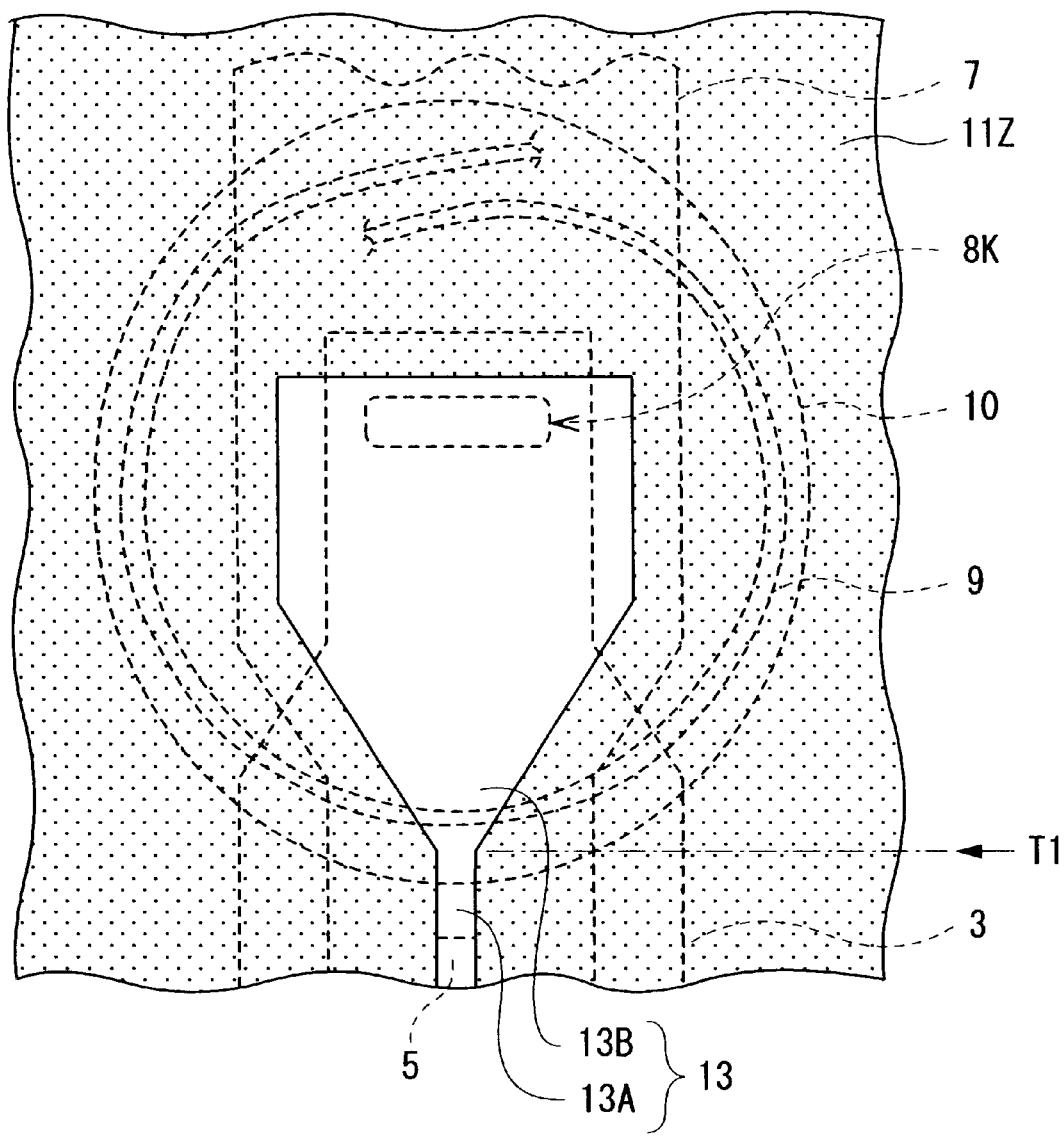
FIG. 10 is a plan view corresponding to the cross sectional views shown in FIGS. 2A and 2B.

Next, a material having a higher saturation magnetic flux density than a saturation magnetic flux density of, for example, a material of the precursory underlayer 11Z formed in the step described above, specifically, Permalloy (Ni: 55 wt %, Fe: 45 wt %), a nickel-cobalt-iron alloy (FeCoNi), a cobalt-iron alloy (CoFe) or the like is selectively grown with a thickness of about 0.3 μm to 6.0 μm in the opening 12K of the photoresist pattern 12 by, for example, plating using the precursory underlayer 11Z formed in the step described above and the photoresist pattern 12 as a seed layer and a mask, respectively. Thus, as shown in FIGS. 2A and 2B and FIG. 10, the coating layer 13 to form a part of the top pole 30 to be described later (see FIGS. 4A and 4B) is selectively formed on the precursory underlayer 11Z in a region extending from the side to be formed into the air bearing surface 20 in the step to be described (the left side in FIG. 2A and the bottom side in FIG. 10) to the opening 8K, so as to coat the insulating layer 10. FIGS. 2A and 2B and FIG. 10 show a state in which the photoresist pattern 12 is removed after forming the coating layer 13.

For example, as shown in FIG. 14 to be described later, the coating layer 13 is formed so as to include an tip portion 13A having a very minute uniform width (e.g., about 0.3 μm) for determining a write track width and a yoke portion 13B having a greater width than the width of the tip portion 13A, which are provided in order from the side to be formed into the air bearing surface 20 in the following step, and also the coating layer 13 is formed so that a coupling position (a first coupling position) T1 at which the tip portion 13A is coupled to the yoke portion 13B is located rearward with respect to a position of a front edge of the insulating layer 10. In the above-mentioned step of forming the photoresist pattern 12, a position in the opening 12K corresponding to the first coupling position T1 is, of course, previously adjusted so as to be located rearward with respect to the position of the front edge of the insulating layer 10, in order that the first coupling position T1 of the coating layer 13 may be located rearward with respect to the position of the front edge of the insulating layer 10. Detailed features of a shape of the coating layer 13 will be described later. The tip portion 13A corresponds to a specific example of "a first uniform-width portion" of the invention, and the yoke portion 13B corresponds to a specific example of "a first wide portion" of the invention.

Figures 3A, 3B:
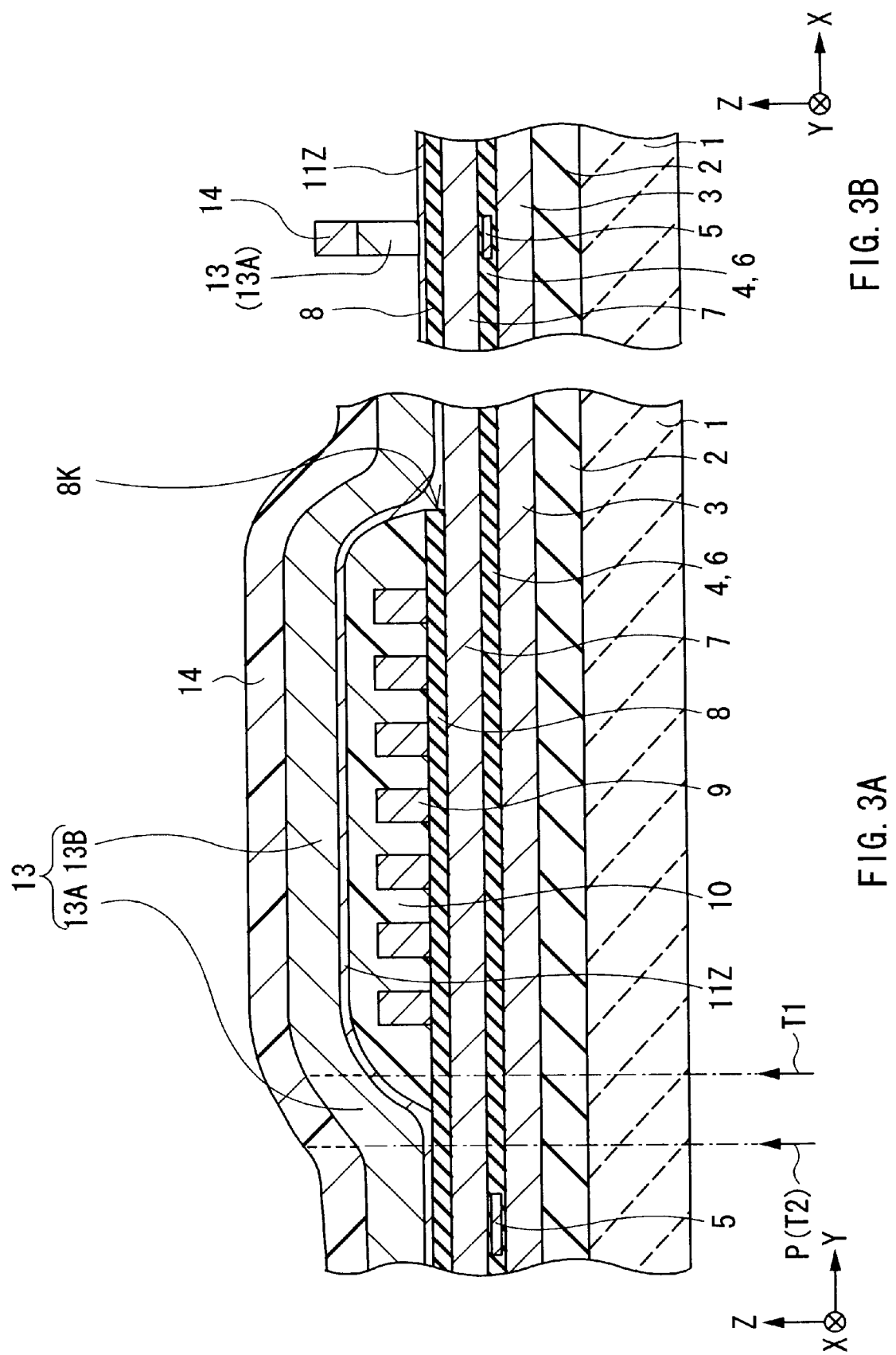
FIGS. 3A and 3B are cross sectional views for describing a step following the step of FIGS. 2A and 2B.
Figure 11:
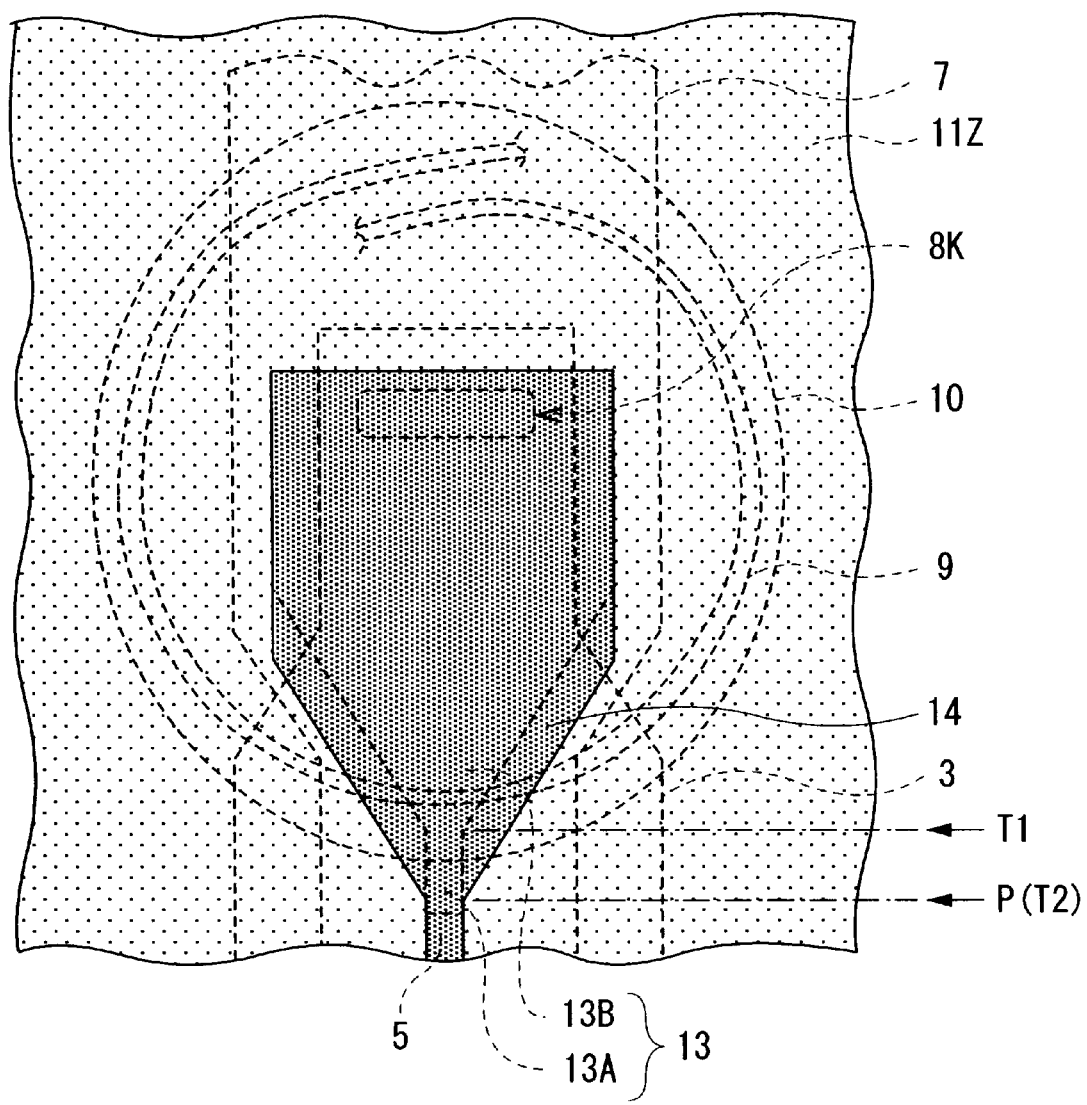
FIG. 11 is a plan view corresponding to the cross sectional views shown in FIGS. 3A and 3B.

Next, the overall surface is coated with a photoresist so that a photoresist film is formed, and thereafter the photoresist film is patterned by using high-accuracy photolithography, whereby a mask 14 (a dense halftone-dot-meshed area in FIG. 11) for patterning the precursory underlayer 11Z is selectively formed as shown in FIGS. 3A and 3B and FIG. 11. The mask 14 is formed so as to have a planar shape corresponding to the coating layer 13 for example, and so that, in particular, a position on the mask 14 corresponding to the first coupling position T1 of the coating layer 13, i.e., a position P at which a width of the mask 14 starts becoming greater than the uniform width corresponding to the tip portion 13A of the coating layer 13, is located frontward with respect to the position of the front edge of the insulating layer 10. The above-mentioned position P at which the width of the mask 14 starts becoming greater than the uniform width substantially corresponds to a second coupling position T2 of the underlayer 11 to be described later (see FIGS. 4A and 4B and FIG. 12), which is to be formed in the following step.

Next, the precursory underlayer 11Z is etched by, for example, ion milling or reactive ion etching (RIE) using the mask 14. Thus, a portion of the precursory underlayer 11Z except a region where the mask 14 is provided is selectively etched, so that the underlayer 11 to form another part of the top pole 30 is selectively formed as the remaining portion of the precursory underlayer 11Z, as shown in FIGS. 4A and 4B and FIG. 12. The underlayer 11 is formed so as to include an underlayer front-end portion 11A having a uniform width corresponding to the uniform width of the tip portion 13A of the coating layer 13, and an underlayer rear-end portion 11B having a greater width than the width of the underlayer front-end portion 11A, which are provided in order from the side to be formed into the air bearing surface 20 in the step to be described layer. A coupling position (the second coupling position) T2 of the underlayer 11, at which the underlayer front-end portion 11A is coupled to the underlayer rear-end portion 11B, is located frontward with respect to the first coupling position Ti of the coating layer 13. Thus, the top pole 30 comprising a laminate constituted of the underlayer 11 and the coating layer 13, which are laminated in this order, is formed. The top pole 30 is magnetically coupled to the bottom pole 7 in the opening 8K, so that a propagation path of a magnetic flux, namely, a magnetic path is formed by the bottom pole 7 and the top pole 30. The underlayer front-end portion 11A corresponds to a specific example of "a second uniform-width portion" of the invention, the underlayer rear-end portion 11B corresponds to a specific example of "a second wide portion" of the invention, and the top pole 30 comprising the laminate constituted of the underlayer 11 and the coating layer 13 corresponds to a specific example of "one of two magnetic layers" of the invention.

Figure 5A:
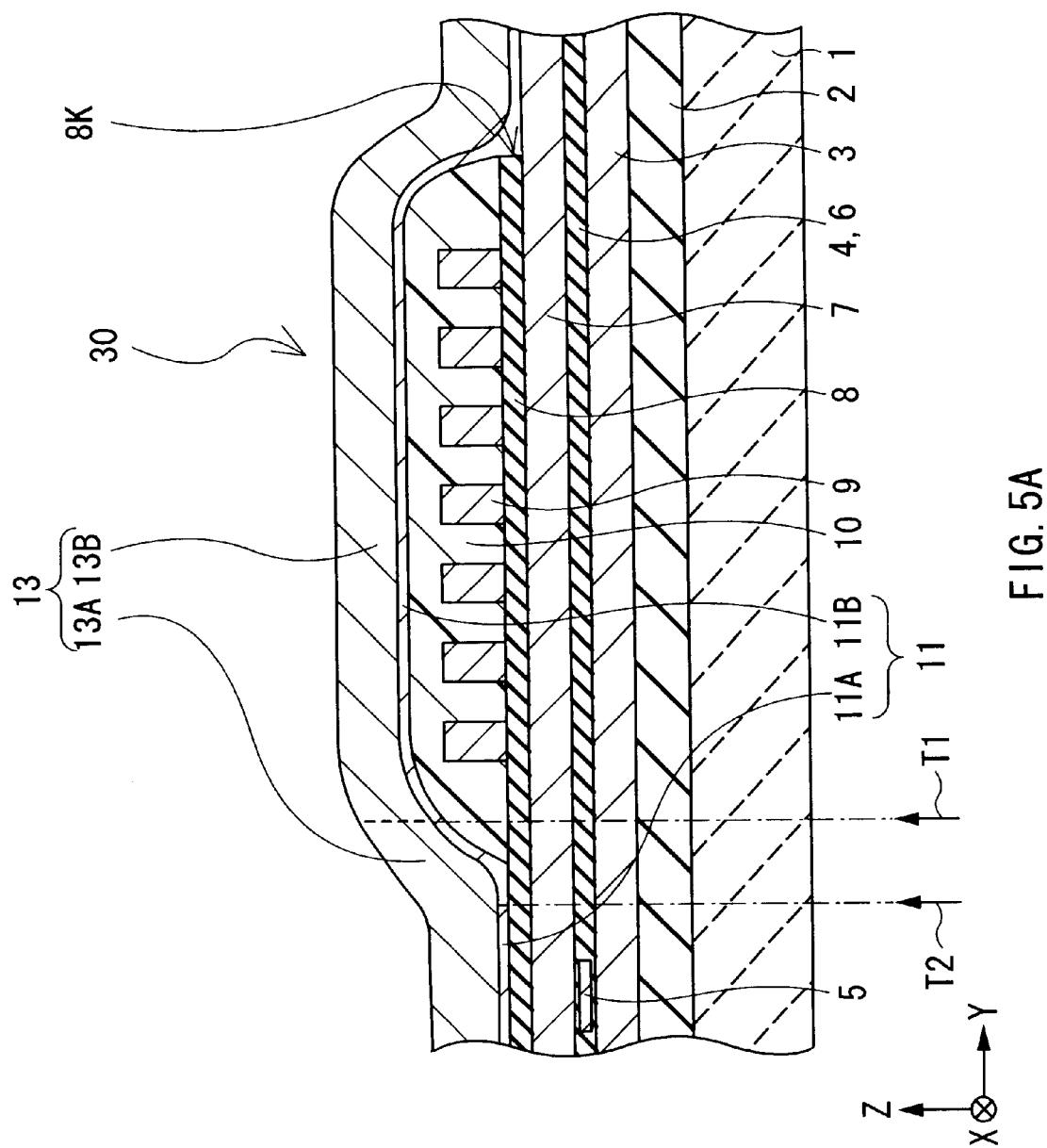
FIGS. 5A and 5B are cross sectional views for describing a step following the step of FIGS. 4A and 4B.
Figure 5B:
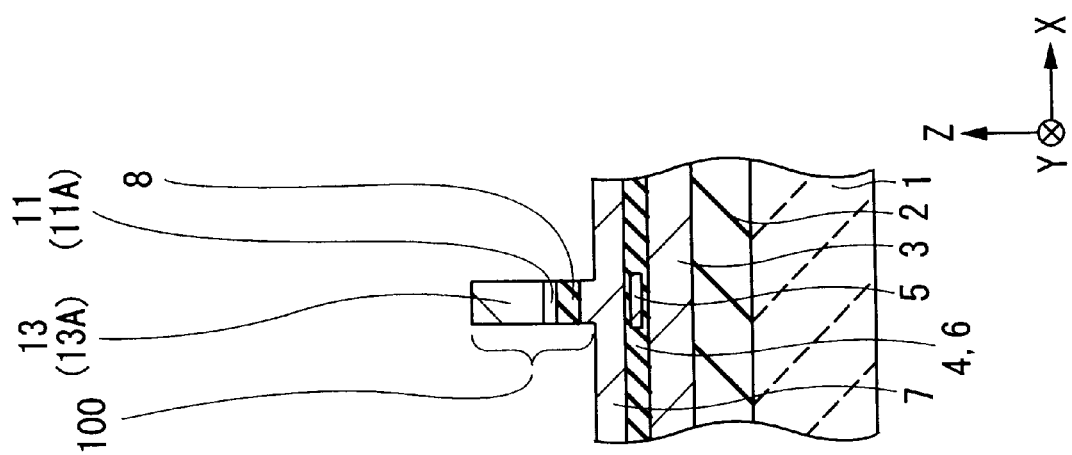

Next, the write gap layer 8 and the bottom pole 7 around the tip portion 13A are etched by about 0.5 μm in self-alignment by, for example, ion milling or RIE using as masks, for instance, the tip portion 13A of the coating layer 13 and a photoresist film (not shown) selectively formed in a region located rearward with respect to the second coupling position T2 in the underlayer 11. Thus, a pole portion 100 having a trim structure is formed as shown in FIGS. 5A and 5B and FIG. 13. The pole portion 100 comprises the tip portion 13A of the coating layer 13, the underlayer front-end portion 11A of the underlayer 11, and the respective portions of both of the bottom pole 7 and the write gap layer 8 corresponding to the tip portion 13A, and these portions have substantially the same width.

Figures 6A, 6B:
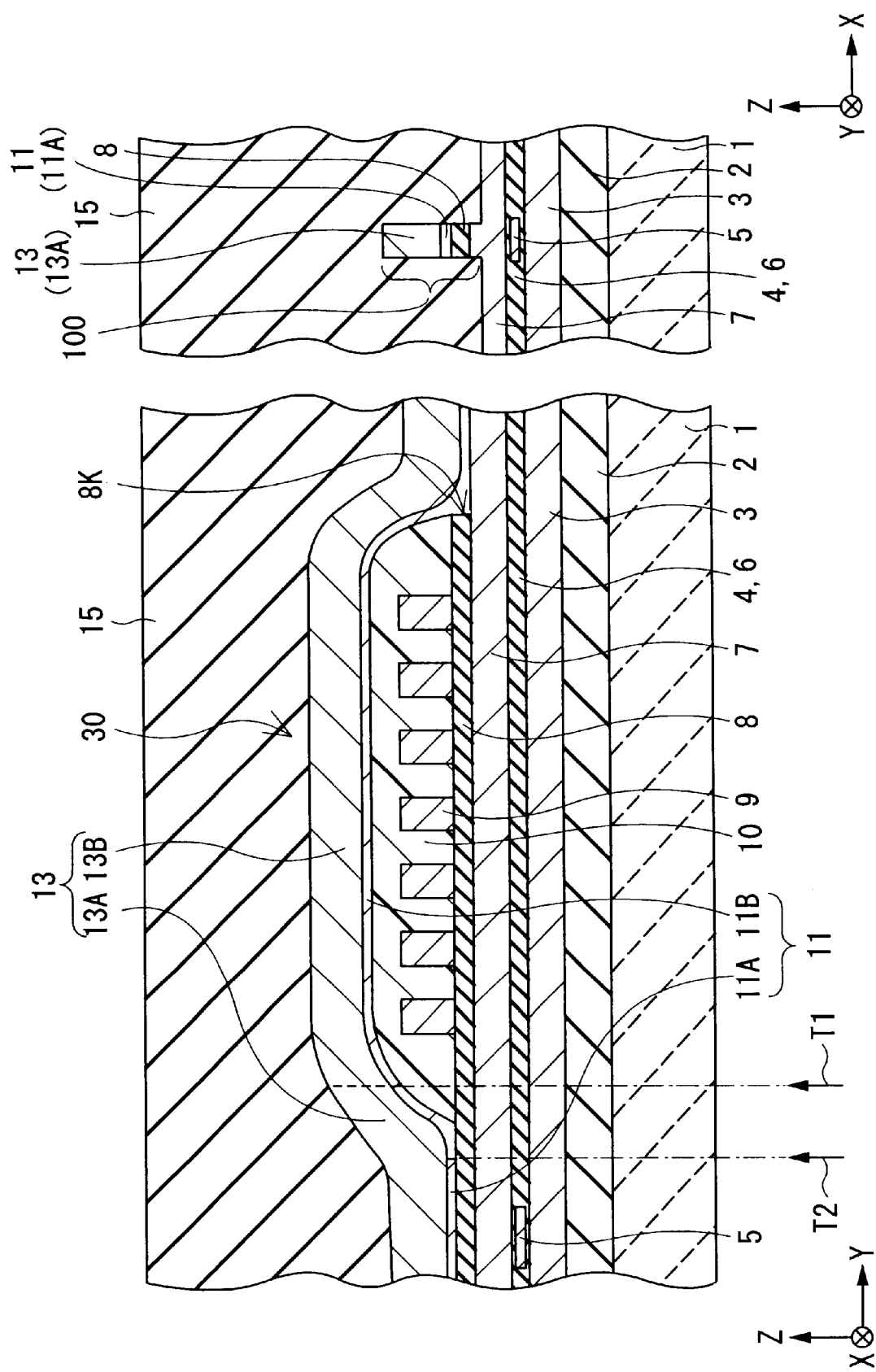
FIGS. 6A and 6B are cross sectional views for describing a step following the step of FIGS. 5A and 5B.

Next, as shown in FIGS. 6A and 6B, an overcoat layer 15 made of an insulating material, e.g., an inorganic insulating material such as alumina, is formed with a thickness of about 20 μm to 40 μm so as to coat the overall surface.

Finally, as shown in FIGS. 7A and 7B, the air bearing surface 20 of a recording head and a reproducing head is formed by machining and polishing, so that the thin film magnetic head is completed.

Structure of the Thin Film Magnetic Head

Next, a planar structure of the thin film magnetic head according to the embodiment will be described with reference to FIG. 14.

FIG. 14 shows a schematic view of the planar structure of the thin film magnetic head manufactured by the method of manufacturing a thin film magnetic head according to the embodiment. FIG. 14 does not show the substrate 1, the insulating layer 2, the write gap layer 8, the overcoat layer 15 and so on. FIG. 14 shows a part of the outermost turn of the thin film coil 9, and shows the outer edge of the insulating layer 10. FIG. 7A corresponds to a cross section taken in the direction of the arrows along the line VIIA—VIIA of FIG. 14.

The position of the front edge of the insulating layer 10 (a dense halftone-dot-meshed area in FIG. 14) is a reference position for determining a throat height (TH) that is one of factors that determine the performance of the recording head, i.e., a throat height zero position (a THO position). The throat height (TH) is defined as a length between the position of the front edge of the insulating layer 10 (the THO position) and the air bearing surface 20.

As described above, for example, the top pole 30 comprises the laminate constituted of the underlayer 11 and the coating layer 13, which are laminated in order from the side of the write gap layer 8.

As described above, for example, the coating layer 13 includes the tip portion 13A having a very minute uniform width W for determining the write track width, and the yoke portion 13B magnetically coupled to the tip portion 13A at the first coupling position T1 and for holding a magnetic flux generated by the thin film coil 9, which are provided in order from the side of the air bearing surface 20. The tip portion 13A has a rectangular planar shape, for example. The width of the yoke portion 13B is greater than the width W of the tip portion 13A, and, for example, the width of the yoke portion 13B is substantially uniform in the rearward portion thereof and is gradually narrower in the frontward portion thereof closer to the air bearing surface 20.

As described above, for example, the underlayer 11 includes the underlayer front-end portion 11A having a uniform width W corresponding to the width of the tip portion 13A of the coating layer 13, and the underlayer rear-end portion 11B magnetically coupled to the underlayer front-end portion 11A at the second coupling position T2 and having a shape corresponding to the yoke portion 13B, which are provided in order from the side of the air bearing surface 20.

As described above, the coupling position (the first coupling position) T1 of the coating layer 13, at which the tip portion 13A is coupled to the yoke portion 13B, is located rearward with respect to the coupling position (the second coupling position) T2 of the underlayer 11, at which the underlayer front-end portion 11A is coupled to the underlayer rear-end portion 11B. In other words, a distance L1 between the first coupling position T1 and the air bearing surface 20 (hereinafter referred to as "a first uniform-width distance") is longer than a distance L2 between the second coupling position T2 and the air bearing surface 20 (hereinafter referred to as "a second uniform-width distance").

Operation of Thin Film Magnetic Head

Next, an operation of the thin film magnetic head according to the embodiment will be described with reference to FIGS. 7A, 7B, 13 and 14.

In the thin film magnetic head, at the time of a recording operation of information, a current passes through the thin film coil 9 by an external circuit (not shown), and thus a magnetic flux is generated in response to the current. The generated magnetic flux is held in the yoke portion 13B of the coating layer 13, and thereafter the magnetic flux propagates from the yoke portion 13B to the tip portion 13A and propagates from the yoke portion 13B to the underlayer rear-end portion 11B of the underlayer 11. The magnetic flux that propagates to the tip portion 13A further propagates and reaches to a tip portion of the tip portion 13A close to the air bearing surface 20. A signal magnetic field for recording is generated outside near the write gap layer 8 by the magnetic flux that reaches to the tip portion of the tip portion 13A. On the other hand, the magnetic flux that propagates to the underlayer rear-end portion 11B reaches to a tip portion of the underlayer front-end portion 11A and is then emitted as a signal magnetic field, as in the case of the magnetic flux that propagates from the yoke portion 13B to the tip portion 13A. A magnetic recording medium is partly magnetized by these signal magnetic fields, so that information is recorded on the magnetic recording medium.

At the time of a reproducing operation of information, a sense current passes through the MR film 5. Since resistance of the MR film 5 changes in response to a signal magnetic field from the magnetic recording medium, information recorded on the magnetic recording medium can be read out by detecting the resistance change in response to a change in the sense current.

Functions and Effects of the Embodiment

Figure 15:
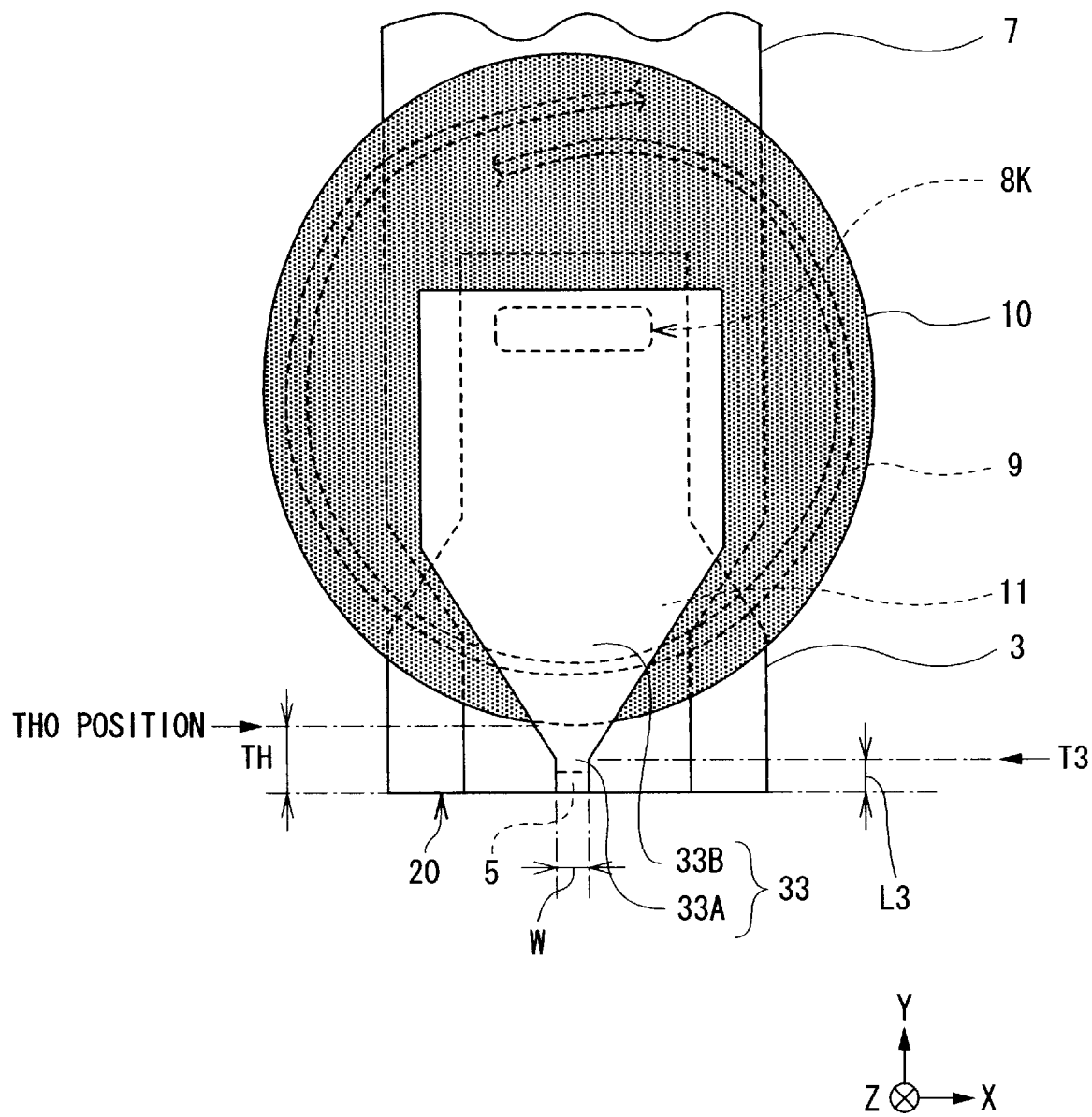
FIG. 15 is a plan view of a planar structure of a thin film magnetic head of a comparison to the thin film magnetic head according to the embodiment of the invention.
Figure 16:
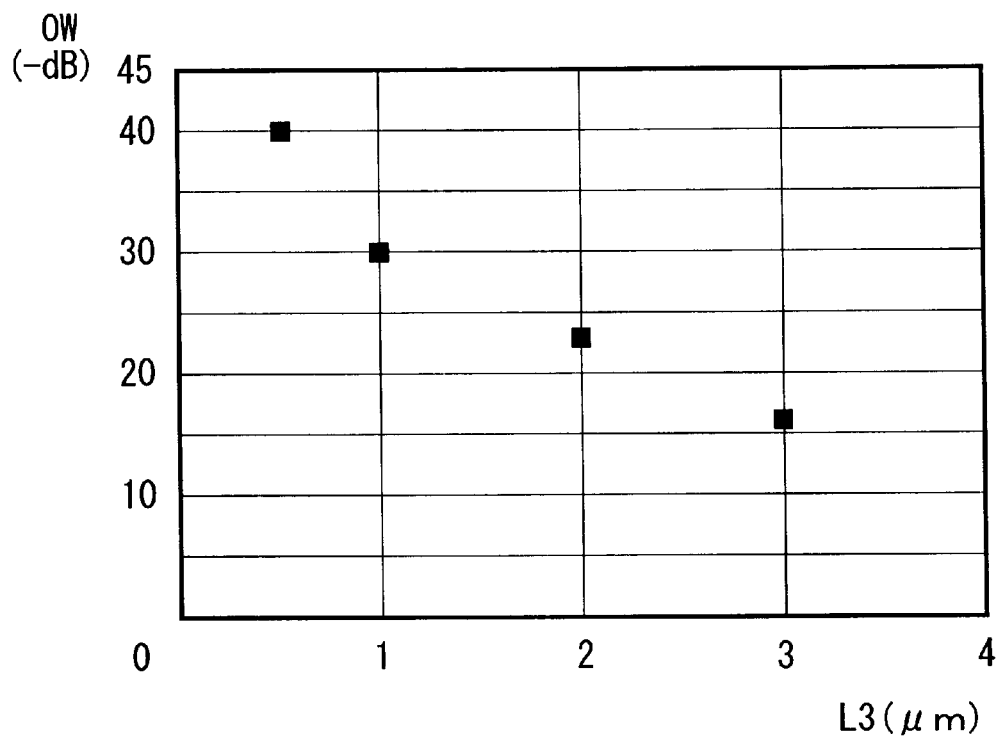
FIG. 16 is a plot of a general correlation between a third uniform-width distance and overwrite characteristics.
Figure 17:
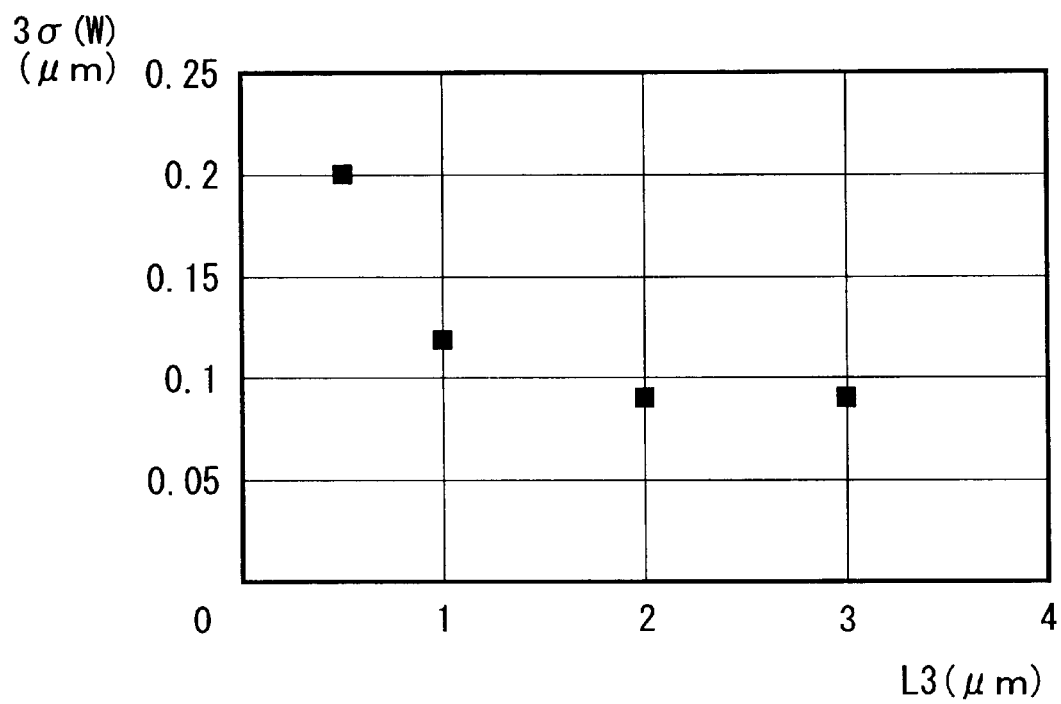
FIG. 17 is a plot of a general correlation between a third uniform-width distance and overwrite characteristics.
Figure 18:
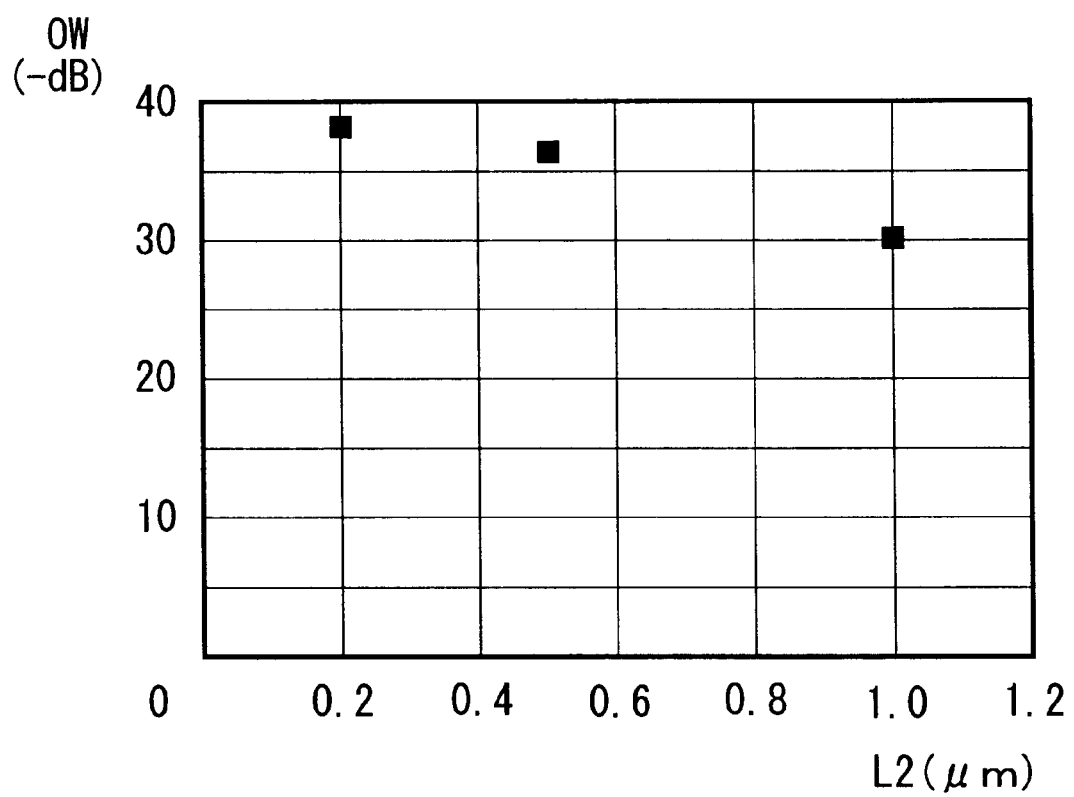
FIG. 18 is a plot of correlation between a second uniform-width distance and overwrite characteristics in the thin film magnetic head according to the embodiment of the invention.

Next, functions and effects of the embodiment will be described with reference to FIGS. 14 to 18. FIG. 15 shows a planar structure of a thin film magnetic head of a comparison to the thin film magnetic head manufactured by the method of manufacturing a thin film magnetic head according to the embodiment. In the thin film magnetic head of the comparison shown in FIG. 15, the top pole 30 comprising the laminate constituted of the underlayer 11 and the coating layer 13 of the thin film magnetic head according to the embodiment is replaced by, for example, a top pole 33 comprising a single layer constituted of an tip portion 33A and a yoke portion 33B coupled to the tip portion 33A at a third coupling position T3, which correspond to the tip portion 13A and the yoke portion 13B of the coating layer 13, respectively. FIG. 16 shows a general correlation between a distance L3 between the third coupling position T3 of the top pole 33 and the air bearing surface 20 (hereinafter referred to as "a third uniform-width distance") and overwrite characteristics of the thin film magnetic head in the thin film magnetic head of the comparison shown in FIG. 15. FIG. 17 shows a general correlation between the third uniform-width distance L3 and a width W of the tip portion 33A of the top pole 33. FIG. 18 shows the correlation between the second uniform-width distance L2 and overwrite characteristics in the thin film magnetic head according to the embodiment (the first uniform-width distance L1 is fixed to about 1 $\mu$m). In FIG. 16, "the horizontal axis" indicates the third uniform-width distance L3 ($\mu$m), and "the vertical axis" indicates the overwrite (OW) characteristics (–dB). In FIG. 17, "the horizontal axis" indicates the third uniform-width distance L3 ($\mu$m), and "the vertical axis" indicates a standard deviation (3$\sigma$) of the difference between the desired width (e.g., 0.3 $\mu$m) of the tip portion 33A and the actual width. In FIG. 18, "the horizontal axis" indicates the second uniform-width distance L2 ($\mu$m), and "the vertical axis" indicates the overwrite characteristics (–dB). The structure of the thin film magnetic head of the comparison shown in FIG. 15 except the top pole 33 is the same as that of the thin film magnetic head according to the embodiment (see FIG. 14).

In the embodiment, the first coupling position T1 is located rearward with respect to the second coupling position T2, so that, for the following reason, the embodiment can quite reduce a pole width to a very minute level with high accuracy while improving the overwrite characteristics of the thin film magnetic head.

That is, in the case of the comparison (see FIG. 15), the third coupling position T3 of the top pole 33 is shifted frontward so that the third uniform-width distance L3 is reduced, as compared to the case of the embodiment (see FIG. 14). In this case, as shown in a plot of correlation of FIG. 16, a more sufficient magnetic flux reaches to the tip portion 33A as the third uniform-width distance L3 is shorter, so that the overwrite characteristics of the thin film magnetic head improve. However, as shown in a plot of correlation of FIG. 17, a value of the standard deviation (3$\sigma$) increases as the third uniform-width distance L3 decreases, so that the accuracy in forming the tip portion 33A deteriorates. This is caused for the following reason: that is, for example, when, in the step of forming a photoresist pattern for forming the top pole 33, a photoresist film is exposed to light and developed so as to form an opening, a portion of the opening corresponding to the third coupling position T3 is overexposed to light due to an influence of reflected light from a hill-shaped underlayer (the insulating layer 10), and therefore it is difficult to form the photoresist pattern with high accuracy (that is, a width of the opening increases). The tip portion 33A is used as a mask for forming the pole portion 100 as in the case of the tip portion 13A of the coating layer 13 according to the embodiment, and therefore the deterioration in the accuracy in forming the tip portion 33A makes it difficult to reduce a width of the pole portion 100 (the pole width) to a very minute level.

On the other hand, in the embodiment (see FIG. 13), the top pole 30 comprises the laminate constituted of the underlayer 11 and the coating layer 13, and therefore a planar shape of the coating layer 13 can be different from a planar shape of the underlayer 11, unlike the case of the comparison in which the single-layer top pole 33 is used. In this case, the first coupling position T1 is allowed to differ from the second coupling position T2, so that the first uniform-width distance L1 and the second uniform-width distance L2 can be set independently of each other. Accordingly, the first coupling position T1 is located rearward with respect to the second coupling position T2, so that the embodiment can reduce the second uniform-width distance L2 within such a range that the accuracy in forming the tip portion 13A can be ensured, while increasing the first uniform-width distance L1 within such a range that the overwrite characteristics can be ensured.

This is apparent from a plot of correlation shown in FIG. 18. In other words, the embodiment reduces the second uniform-width distance L2 while fixing the first uniform-width distance L1 (to about 1 $\mu$m) to such an extent that the accuracy in forming the tip portion 13A can be ensured excellently (e.g., the standard deviation 3$\sigma$ is equal to or less than 0.15), thereby enabling improving the overwrite characteristics.

To ensure superior overwrite characteristics, the embodiment has less need to reduce the first uniform-width distance L1 than the comparison has, and therefore the embodiment can also prevent a side erase phenomenon from occurring. In the comparison, the yoke portion 33B having a greater width than a width of the tip portion 33A is located closer to the air bearing surface 20, and therefore, when a magnetic flux within the yoke portion 33B is emitted to the air bearing surface 20, the side erase phenomenon is more likely to occur due to the emitted magnetic flux. On the other hand, in the embodiment, the yoke portion 13B is located rearward with respect to the air bearing surface 20 at a longer distance (the first uniform-width distance L1) away as compared to the case of the comparison, so that the probability of occurrence of the side erase can be reduced.

In the embodiment, a material having a higher saturation magnetic flux density than a saturation magnetic flux density of a material of the coating layer 13 is used as a material of the underlayer 11, and therefore this also contributes to the improved overwrite characteristics for the following reason. In other words, the propagation of a magnetic flux through the magnetic path depends mainly on "the capacity for holding a magnetic flux", which is determined by the saturation magnetic flux densities of the materials of the underlayer 11 and the coating layer 13 constituting the magnetic path and the physical volume of each of the portions constituting the underlayer 11 and the coating layer 13. The improvement of the overwrite characteristics requires the following: a sufficient capacity for holding a magnetic flux is ensured in the magnetic path near the air bearing surface 20 so that the propagation of a magnetic flux through the magnetic path is smoothed, whereby a sufficient magnetic flux is supplied to the tip portion of the top pole 30 close to the air bearing surface 20, for example. In the embodiment, in the coating layer 13, the yoke portion 13B having a greater volume than the volume of the tip portion 13A is located rearward with respect to the air bearing surface 20 at the first uniform-width distance L1 away in order to ensure the accuracy in forming the tip portion 13A, whereas, in the underlayer 11, the underlayer rear-end portion 11B having a greater volume than the volume of the underlayer front-end portion 11A is shifted closer to the air bearing surface 20 than a position corresponding to the yoke portion 13B in order to ensure the overwrite characteristics, and therefore the existence of the underlayer rear-end portion 11B allows ensuring the capacity for holding a magnetic flux near the air bearing surface 20. Moreover, the volume of the underlayer rear-end portion 11B is smaller than the volume of the yoke portion 13B, but the underlayer 11 is made of the material having the higher saturation magnetic flux density than the saturation magnetic flux density of the material of the coating layer 13, and therefore the propagation of a magnetic flux through the underlayer 11 is smoothed although the underlayer 11 has only a relatively small volume. Accordingly, a sufficient volume of magnetic flux reaches to the tip portion of the top pole 30 close to the air bearing surface 20.

Although the invention has been described above by referring to the embodiment, the invention is not limited to the above-mentioned embodiment and various modifications of the invention are possible. For example, in the above-mentioned embodiment, the underlayer 11 is formed by patterning the precursory underlayer 11Z formed by sputtering, and the coating layer 13 is formed by plating, but the methods of forming the underlayer 11 and the coating layer 13 are not necessarily limited to this embodiment, and the methods of forming the underlayer 11 and the coating layer 13 can be changed so long as the underlayer 11 and the coating layer 13 can have the structural features (the first coupling position T1, the second coupling position T2 and so on) described by referring to the above-mentioned embodiment. Specifically, the underlayer 11 may be formed by, for example, plating without the use of patterning. Also in this case, the same effects as the effects of the above-mentioned embodiment can be obtained.

The shapes, dimensions, materials, the methods and so on relating to forming a series of structural elements constituting the thin film magnetic head are not necessarily limited to the shapes, dimensions, materials, forming methods and so on described by referring to the above-mentioned embodiment, and they can be modified so long as the structural features, material features and so on of the structural elements can be realized.

For example, the method of manufacturing the composite thin film magnetic head has been described by referring to the above-mentioned embodiment, but the invention can be applied to a record-only thin film magnetic head having an inductive magnetic transducer for writing or a thin film magnetic head having an inductive magnetic transducer for both recording and reproducing. Moreover, the invention can be applied to a thin film magnetic head having a structure in which the element for writing and the element for reading are laminated in reverse order.

As described above, according to the thin film magnetic head or the method of manufacturing a thin film magnetic head of one aspect of the invention, the second coupling position of the underlayer is located closer to the recording-medium-facing surface than the first coupling position of the coating layer, and therefore the thin film magnetic head or the method of manufacturing the same can reduce the distance between the second coupling position and the recording-medium-facing surface within such a range that the accuracy in forming the first uniform-width portion of the coating layer can be ensured, while increasing the distance between the first coupling position and the recording-medium-facing surface within such a range that the overwrite characteristics can be ensured. Accordingly, the pole width can be reduced to a very minute level with high accuracy while improving the overwrite characteristics.

According to the method of manufacturing a thin film magnetic head of another aspect of the invention, after the precursory underlayer is formed, the underlayer is formed by selectively etching the precursory underlayer by use of the mask, and therefore the first coupling position of the coating layer can be allowed to differ from the second coupling position of the underlayer. Therefore, the distance between the first coupling position and the recording-medium-facing surface can be set independently of the distance between the second coupling position and the recording-medium-facing surface.

Particularly, when a material having a higher saturation magnetic flux density than a saturation magnetic flux density of the material of the coating layer is used as the material of the underlayer, the propagation of a magnetic flux through the magnetic path can be smoothed.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising: two magnetic layers magnetically coupled to each other and having two magnetic poles which face each other with a gap layer in between and are arranged to be faced with a recording medium, a thin film coil provided between the two magnetic layers, and an insulating layer for insulating the thin film coil from the two magnetic layers, wherein one of the two magnetic layers includes a laminate constituted of an underlayer and a coating layer, the underlayer being located closer to the gap layer, the coating layer being located away from the gap layer, the coating layer includes a first uniform-width portion and a first wider portion, the first uniform-width portion extending from a recording-medium-facing surface facing the recording medium to a first coupling position away from the recording-medium-facing surface and having a uniform width for determining a write track width on the recording medium, the first wider portion being magnetically coupled to the first uniform-width portion at the first coupling position and having a width greater than that of the uniform width of the first uniform-width portion, and the underlayer includes a second uniform-width portion and a second wider portion, the second uniform-width portion extending from the recording-medium-facing surface to a second coupling position which locates closer to the recording-medium-facing surface than the first coupling position and having a uniform width corresponding to the uniform width of the first uniform-width portion, the second wider portion being magnetically coupled to the second uniform-width portion at the second coupling position and having a width greater than that of the uniform width of the second uniform-width portion.

2. A thin film magnetic head according to claim 1, wherein the underlayer is made of a material having a higher saturation magnetic flux density than a saturation magnetic flux density of a material which the coating layer is made of.

3. A thin film magnetic head according to claim 2, wherein the underlayer is made of a material containing nickel iron, iron nitride or cobalt iron, and the coating layer is made of a material containing nickel iron, nickel cobalt iron or cobalt iron.

4. A thin film magnetic head according to claim 3, wherein the coating layer is formed of a plated film, and the underlayer is an electrode for forming the coating layer by plating.

5. A thin film magnetic head according to claim 2, wherein the coating layer is formed of a plated film, and the underlayer is an electrode for forming the coating layer by plating.

6. A thin film magnetic head according to claim 2, wherein a thickness of the coating layer lie s between 0.3 $\mu$m and 6 $\mu$m inclusive, and a thickness of the underlayer lies between 0.05 $\mu$m and 0.3 $\mu$m inclusive.

7. A thin film magnetic head according to claim 1, wherein the underlayer is made of a material containing nickel iron (NiFe), iron nitride (FeN) or cobalt iron (CoFe), and the coating layer is made of a material containing nickel iron, nickel cobalt iron (FeCoNi) or cobalt iron.

8. A thin film magnetic head according to claim 7, wherein the coating layer is formed of a plated film, and the underlayer is an electrode for forming the coating layer by plating.

9. A thin film magnetic head according to claim 1, wherein the coating layer is formed of a plated film, and the underlayer is an electrode for forming the coating layer by plating.

10. A thin film magnetic head according to claim 1, wherein a thickness of the coating layer lies between 0.3 $\mu$m and 6 $\mu$m inclusive, and a thickness of the underlayer lies between 0.05 $\mu$m and 0.3 $\mu$m inclusive.

11. A method of manufacturing a thin film magnetic head including: two magnetic layers magnetically coupled to each other and having two magnetic poles which face each other with a gap layer in between and are arranged to be faced with a recording medium, a thin film coil provided between the two magnetic layers, and an insulating layer for insulating the thin film coil from the two magnetic layers, wherein steps of forming one of the two magnetic layers includes:

a first step of forming a precursory underlayer so as to coat the insulating layer and a peripheral region around the insulating layer;

a second step of forming on the precursory underlayer a coating layer as a part of the one of the two magnetic layers, so that the coating layer includes a first uniform-width portion and a first wider portion, the first uniform-width portion extending from a recording-medium-facing surface facing the recording medium to a first coupling position away from the recording-medium-facing surface and having a uniform width for determining a write track width on the recording medium, the first wider portion being magnetically coupled to the first uniform-width portion at the first coupling position and having a width greater than that of the uniform width of the first uniform-width portion;

a third step of selectively forming a patterning mask so as to coat the coating layer and part of the precursory underlayer; and a fourth step of selectively etching the precursory underlayer through the use of the patterning mask, thereby selectively forming an underlayer as another part of the one of the two magnetic layers, so that the underlayer includes a second uniform-width portion and a second wider portion, the second uniform-width portion extending from the recording-medium-facing surface to a second coupling position which locates closer to the recording-medium-facing surface than the first coupling position and having a uniform width corresponding to the uniform width of the first uniform-width portion, the second wider portion being magnetically coupled to the second uniform-width portion at the second coupling position and having a width greater than that of the uniform width of the second uniform-width portion.

12. A method of manufacturing a thin film magnetic head according to claim 11, wherein a material having a higher saturation magnetic flux density than a saturation magnetic flux density of a material of the coating layer is used as a material of the underlayer.

13. A method of manufacturing a thin film magnetic head according to claim 12, wherein a material containing nickel iron, iron nitride or cobalt iron is used as the material of the underlayer, and a material containing nickel iron, nickel cobalt iron or cobalt iron is used as the material of the coating layer.

14. A method of manufacturing a thin film magnetic head according to claim 13, wherein the precursory underlayer in the first step is formed by sputtering, and the coating layer in the second step is formed by plating using the precursory underlayer as an electrode.

15. A method of manufacturing a thin film magnetic head according to claim 12, wherein the precursory underlayer in the first step is formed by sputtering, and the coating layer in the second step is formed by plating using the precursory underlayer as an electrode.

16. A method of manufacturing a thin film magnetic head according to claim 12, wherein the coating layer in the second step is formed so as to have a thickness between 0.3 $\mu$m and 6 $\mu$m inclusive, and the underlayer in the fourth step is formed so as to have a thickness between 0.05 $\mu$m and 0.3 $\mu$m inclusive.

17. A method of manufacturing a thin film magnetic head according to claim 11, wherein a material containing nickel iron, iron nitride or cobalt iron is used as the material of the underlayer, and a material containing nickel iron, nickel cobalt iron or cobalt iron is used as the material of the coating layer.

18. A method of manufacturing a thin film magnetic head according to claim 17, wherein the precursory underlayer in the first step is formed by sputtering, and the coating layer in the second step is formed by plating using the precursory underlayer as an electrode.

19. A method of manufacturing a thin film magnetic head according to claim 11, wherein the precursory underlayer in the first step is formed by sputtering, and the coating layer in the second step is formed by plating using the precursory underlayer as an electrode.

20. A method of manufacturing a thin film magnetic head according to claim 11, wherein the coating layer in the second step is formed so as to have a thickness between 0.3 $\mu$m and 6 $\mu$m inclusive, and the underlayer in the fourth step is formed so as to have a thickness between 0.05 $\mu$m and 0.3 $\mu$m inclusive.

21. A method of manufacturing a thin film magnetic head including: two magnetic layers magnetically coupled to each other and having two magnetic poles which face each other with a gap layer in between and are arranged to be faced with a recording medium, a thin film coil provided between the two magnetic layers, and an insulating layer for insulating the thin film coil from the two magnetic layers, one of the two magnetic layers including a laminate constituted of an underlayer and a coating layer, the underlayer being located closer to the gap layer, the coating layer being located away from the gap layer, wherein the coating layer is formed so as to include a first uniform-width portion and a first wider portion, the first uniform-width portion extending from a recording-medium-facing surface facing the recording medium to a first coupling position away from the recording-medium-facing surface and having a uniform width for determining a write track width on the recording medium, the first wider portion being magnetically coupled to the first uniform-width portion at the first coupling position and having a width greater than that of the uniform width of the first uniform-width portion, and the underlayer is formed so as to include a second uniform-width portion and a second wider portion, the second uniform-width portion extending from the recording-medium-facing surface to a second coupling position which locates closer to the recording-medium-facing surface than the first coupling position and having a uniform width corresponding to the uniform width of the first uniform-width portion, the second wider portion being magnetically coupled to the second uniform-width portion at the second coupling position and having a width greater than that of the uniform width of the second uniform-width portion.

\* \* \* \* \*

UNITED STATES PATENT AND TRADEMARK OFFICE
CERTIFICATE OF CORRECTION

PATENT NO.      : 6,665,144 B2
DATED           : December 16, 2003
INVENTOR(S)     : Naoto Matono It is certified that error appears in the above-identified patent and that said Letters Patent is hereby corrected as shown below:

Column 6,
Line 38, change "attic" to -- altic --.

Column 9,
Lines 62 an 64, change "THO" to -- TH0 --.

Column 15,
Line 19, change "lie s" to -- lies --.

Signed and Sealed this

Twenty-sixth Day of October, 2004

JON W. DUDAS
*Director of the United States Patent and Trademark Office*